(12) United States Patent
Yamaji

(10) Patent No.: US 12,462,523 B2
(45) Date of Patent: Nov. 4, 2025

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Kei Yamaji, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 440 days.

(21) Appl. No.: 18/051,231

(22) Filed: Oct. 31, 2022

(65) Prior Publication Data

US 2023/0196713 A1 Jun. 22, 2023

(30) Foreign Application Priority Data

Nov. 8, 2021 (JP) .................................. 2021-181894

(51) Int. Cl.
*G06V 10/764* (2022.01)
*G06V 10/44* (2022.01)

(52) U.S. Cl.
CPC ............ *G06V 10/44* (2022.01); *G06V 10/764* (2022.01)

(58) Field of Classification Search
CPC .... G06V 20/30; G06V 40/172; G06V 40/179; G06V 10/44; G06V 10/764; G06T 7/187; G06T 7/70
See application file for complete search history.

(56) References Cited

U.S. PATENT DOCUMENTS

| 9,632,664 | B2 * | 4/2017 | Foss ...................... G06F 3/0485 |
| 2009/0225191 | A1 * | 9/2009 | Tachikawa .............. G06F 16/58 348/231.2 |
| 2011/0110592 | A1 * | 5/2011 | Wada ..................... G06V 20/10 382/182 |
| 2012/0127339 | A1 * | 5/2012 | Tachikawa ......... H04N 1/00132 348/231.2 |
| 2016/0004695 | A1 * | 1/2016 | Yang ..................... G06F 3/0485 707/738 |
| 2018/0068019 | A1 * | 3/2018 | Novikoff ............. G06F 16/7867 |
| 2020/0089936 | A1 * | 3/2020 | Noda ................. H04N 1/00442 |

FOREIGN PATENT DOCUMENTS

JP          2020-046901 A        3/2020

* cited by examiner

*Primary Examiner* — Shaghayegh Azima
(74) *Attorney, Agent, or Firm* — Studebaker Brackett PLLC

(57) ABSTRACT

Provided are an image processing apparatus, a method, a program, and a recording medium capable of appropriately selecting images for product creation from an image group provided by a user for every period.

In an image processing apparatus of the present invention, a processor is configured to acquire a first image group captured in a first period, acquire a second image group captured in a second period different from the first period, specify features on two or more items regarding imaging for first images used in product creation in the first image group and second images included in the second image group, specify a trend of features of the first images used in product creation for the two or more items, and select second images for product creation from the second image group based on features of the second images included in the second image group. The processor is configured to select the second images having a feature inconsistent with the trend for a part of items among the two or more items, as the second images for product creation.

19 Claims, 14 Drawing Sheets

| ITEM | IMAGE GROUP OF APRIL | |
|---|---|---|
| SUBJECT PERSON | CHILD | 40% |
| | MOTHER | 40% |
| | FATHER | 40% |
| IMAGING PLACE | HOME | 80% |
| | PARK | 20% |
| IMAGING TIME | MORNING | 60% |
| | AFTERNOON | 40% |
| | NIGHT | 0% |

| ITEM | IMAGE GROUP OF APRIL | MATERIAL IMAGE OF APRIL | IMAGE GROUP OF MAY |
|---|---|---|---|
| SUBJECT PERSON | CHILD 40%<br>MOTHER 40%<br>FATHER 40% | CHILD 90%<br>MOTHER 30%<br>FATHER 10% | CHILD 90%<br>MOTHER 35%<br>FATHER 0% |
| IMAGING PLACE | HOME 80%<br>PARK 20% | HOME 90%<br>PARK 10% | HOME 30%<br>PARK 70% |
| IMAGING TIME | MORNING 60%<br>AFTERNOON 40%<br>NIGHT 0% | MORNING 40%<br>AFTERNOON 60%<br>NIGHT 0% | MORNING 40%<br>AFTERNOON 60%<br>NIGHT 0% |

PAGE CORRESPONDING
TO ORDERED MONTH

PAGE CORRESPONDING
TO NON-ORDERED MONTH

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2021-181894, filed on Nov. 8, 2021. The above application is hereby expressly incorporated by reference, in its entirety, into the present application.

BACKGROUND OF THE INVENTION

1. Field of the Invention

The present invention relates to an image processing apparatus that selects an image for product creation from an image group, an image processing method, a program, and a recording medium storing the program.

2. Description of the Related Art

In using a service for providing a product, such as a photo book, a user as a person who uses the service provides a plurality of images (image group) that are used as materials of the product. That is, the product is created using images selected from the image group provided by the user.

In the above-described service, a case where a product is created for every predetermined period (for example, every month or every year) can be considered. In this case, processing of selecting material images from an image group provided by the user and processing of creating a product using the selected images are repeatedly executed for every fixed period. With this, the user can get an image group for every period.

Incidentally, in selecting images for product creation, that is, material images from an image group provided by the user, for example, it is desirable to select important images for the user or images that match a user's preference. An example of a technique for selecting material images from an image group provided for every period is a technique described in JP2020-46901A.

An image processing apparatus (hereinafter, referred to as an image processing apparatus of the related art) described in JP2020-46901A sets a criterion for image selection based on a first image selected from a first image group and a second image selected from a second image group. Then, the image processing apparatus of the related art selects images based on the above-described criterion in selecting images from an input target image group. With such a configuration, in the image processing apparatus of the related art, it is possible to select preferable images for the user from the target image group while keeping commonality to the first image and the second image selected in the past.

SUMMARY OF THE INVENTION

The criterion for material image selection set by the image processing apparatus of the related art is to select images having a theme (feature) obtained in common from a plurality of first images and a plurality of second images. According to the criterion, for example, in a case where a child is shown in both the first image and the second image, as images having a theme in common to the first image and the second image, images in which the child is shown are selected from the target image group.

On the other hand, in a case of selecting material images from an image group provided for every period, in a case where only images having the common theme are selected, the images included in each product have no big change between the products. As a result, even though a product is provided for every period, each product is monotonous, that is, is short of variation.

An object of the present invention is to provide an image processing apparatus, a method, a program, and a recording medium capable of appropriately selecting images for product creation from an image group provided by a user for every period.

To achieve the above-described object, there is provided an image processing apparatus of an aspect of the present invention comprising a processor, in which the processor is configured to execute first acquisition processing of acquiring a first image group captured in a first period, second acquisition processing of acquiring a second image group captured in a second period different from the first period, feature specification processing of specifying features on two or more items regarding imaging for first images used in product creation in the first image group and second images included in the second image group, trend specification processing of specifying a trend of features of the first images used in product creation for the two or more items, and selection processing of selecting second images for product creation from the second image group based on features of the second images included in the second image group, and in the selection processing, the processor selects the second images having a feature inconsistent with the trend for a part of items among the two or more items, as the second images for product creation.

In the trend specification processing, the processor may obtain a first trend value obtained by digitalizing the trend, and in the selection processing, the processor may select the second images for product creation based on the first trend value.

In the selection processing, the processor may select the second images for product creation such that a difference between a second trend value obtained by digitalizing a trend of features of the second images for product creation and the first trend value is equal to or greater than a set value.

The two or more items may include a priority item that is set depending on the trend, and a non-priority item other than the priority item. In this case, in the selection processing, the processor may select the second images having a feature consistent with the trend for the priority item and a feature inconsistent with the trend for the non-priority item, as the second images for product creation.

In the trend specification processing, the processor may classify the first images used in product creation into a plurality of classifications based on the features of the first images used in product creation for each of the two or more items and calculate a first ratio of first images belonging to each classification for every classification to specify the trend. The processor may be configured to classify the second images included in the second image group into the plurality of classifications based on the features of the second images included in the second image group for each of the two or more items and calculate a second ratio of second images belonging to each classification for every classification.

In the selection processing, the processor may select second images belonging to the classification where the second ratio increases more than the first ratio for the non-priority item, as the second images for product creation.

In the feature specification processing, the processor may further specify features on the two or more items for first images included in the first image group. In this case, in the trend specification processing, the processor may specify the trend of the features of the first images used in product creation and another trend as a trend of the features of the first images included in the first image group for the two or more items. In the selection processing, the processor may select the second images for product creation based on the trend and the other trend.

The processor may be configured to use an image group captured in one period among a plurality of periods and execute first creation processing of creating a first product for the one period, for every period.

The first creation processing may include layout determination processing of determining a layout of images in the first product based on a layout edition operation of a user. In this case, the processor may be configured to suggest the layout of the images in the first product for the first period to the user and create the first product for the second period in the suggested layout in a case where the user employs the suggested layout, in the first creation processing of creating the first product for the second period.

The first creation processing may include material selection processing of selecting material images for use in creating the first product for the one period from the image group captured in the one period. In this case, the processor may be configured to execute re-creation processing of re-creating the first product for the one period in a case where a re-creation condition is satisfied after executing the first creation processing of creating the first product for the one period. The re-creation processing may include reselection processing of selecting the material images for use in re-creating the first product from the image group captured in the one period.

The re-creation processing may be executed in a period later than the one period. In this case, in the reselection processing, the processor may select the material images from the image group captured in the one period based on a trend of features of image groups captured in two or more periods including the one period and the period later than the one period.

The processor may be configured to receive a saving request of a user to the first product. In this case, the processor may be configured to, after the execution of the first creation processing of creating the first product for the one period, not execute the re-creation processing of re-creating the first product for the one period in a case where the saving request to the first product for the one period is received. On the other hand, the processor may be configured to execute the re-creation processing of re-creating the first product for the one period in a case where the saving request to the first product for the one period is not received.

The processor may be configured to receive an order of a user to the first product. In this case, the processor may be configured to, after the execution of the first creation processing of creating the first product for the one period, not execute the re-creation processing of re-creating the first product for the one period in a case where the order to the first product for the one period is received. On the other hand, the processor may be configured to execute the re-creation processing of re-creating the first product for the one period in a case where the order to the first product for the one period is not received.

The processor may be configured to use the material images used in each of the first products created for every period and further execute second creation processing of creating a second product for the plurality of periods. In this case, the second product may be composed by collecting a plurality of second product composition pieces. Then, in the second creation processing, the processor may create each of the plurality of second product composition pieces using the material images used in the creation of the first product for a period corresponding to each second product composition piece among the plurality of periods.

The processor may be configured to receive an order of a user to the first product. In this case, in the second creation processing, the processor may set a layout of the material images in each of the plurality of second product composition pieces depending on presence or absence of an order to the first product for a period corresponding to each second product composition piece.

To solve the above-described problem, there is provided an image processing method of an aspect of the present invention by a processor, in which, with the processor, first acquisition processing of acquiring a first image group captured in a first period, second acquisition processing of acquiring a second image group captured in a second period different from the first period, feature specification processing of specifying features on two or more items regarding imaging for each of first images used in product creation in the first image group and second images included in the second image group, trend specification processing of specifying a trend of features of the first images used in product creation for the two or more items, and selection processing of selecting second images for product creation from the second image group based on features of the second images included in the second image group are executed, and in the selection processing, the second images having a feature inconsistent with the trend for a part of items among the two or more items are selected as the second images for product creation.

According to the present invention, a program that causes a computer to execute respective processing included in the above-described image processing method can be realized. According to the present invention, a computer readable recording medium storing a program that causes a computer to execute respective processing included in the image processing method of an aspect of the present invention can be realized.

According to the present invention, it is possible to appropriately select images for product creation from an image group provided by a user for every period. With this, it is possible to restrain a product created for every period from being monotonous.

DESCRIPTION OF THE PREFERRED EMBODIMENTS

Figure 1:
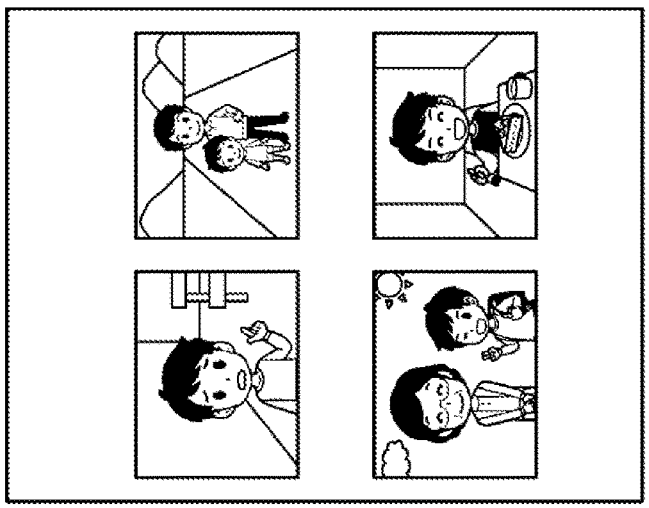
FIG. 1 is a diagram showing an example of a first product.
Figure 1:
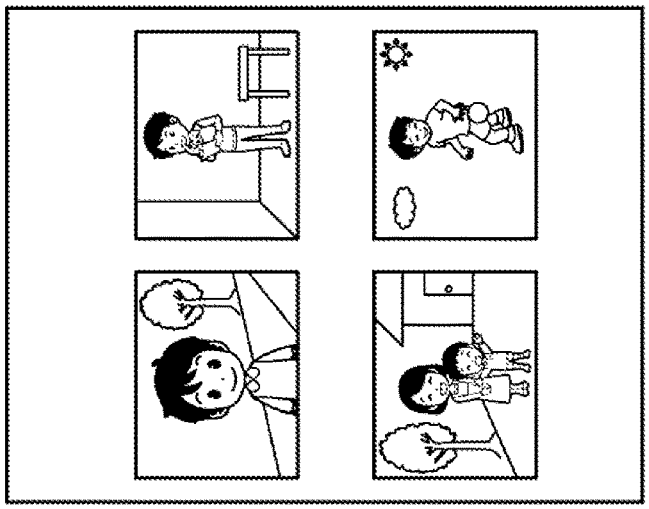
Figure 1:
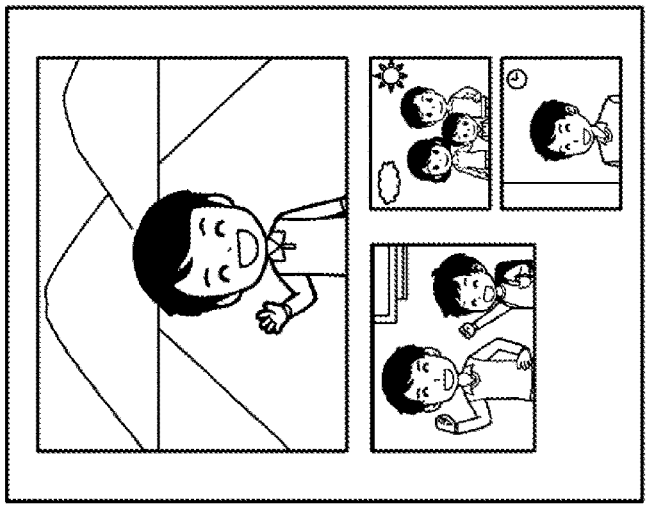

A specific embodiment (hereinafter, referred to as the present embodiment) of the present invention will be described referring to the drawings. Note that the embodiment described below is merely an example for ease of understanding of the present invention, and is not intended to limit the present invention. The present invention can be changed or improved from the embodiment described below without departing from the spirit and scope of the present invention. The present invention includes its equivalents.

In the present specification, an "image" is image data unless otherwise specifically described. Examples of the image data are lossy compression type image data, such as Joint Photographic Experts Group (JPEG) Format, and lossless compression type image data, such as Graphics Interchange Format (GIF) or Portable Network Graphics (PNG) Format.

In the present specification, the concept of "apparatus" includes not only a single apparatus that exhibits a specific function with one apparatus, but also a plurality of apparatuses that are distributed and provided independently of one another and exhibit a specific function in cooperation (conjunction) with one another.

Product Providing Service of Present Embodiment

Prior to description of an image processing apparatus and an image processing method according to the present embodiment, a product providing service that is carried out using the image processing apparatus and the image processing method will be described.

The product providing service is a service that creates a product using a plurality of images provided by a user as a service user and provides the product to the user. The product is, for example, a photo book or an album that is created using the images provided by the user. The type of the product is not particularly limited, and may be a product other than the above-described type, such as a calendar or a collage print image in which the images provided by the user and a decoration image are composed. A method of providing a product is not particularly limited, and data for displaying the product on a display or the like may be provided to the user or the product may be printed and provided to the user in a form of a printed matter.

In creating a product, normally, a plurality of images are needed. For this reason, the user provides images captured by imaging equipment, such as a digital camera, at any time or at fixed intervals. That is, the user gets a product using the product providing service or provides an image group including a plurality of images.

The outline of a procedure for creating a product will be described. First, processing of selecting one or more images as images (hereinafter, referred to as material images) for product creation from the image group provided by the user is executed. Next, processing of creating a product using the material images selected from the image group is executed. In this processing, a layout of the material images in the product is determined. The image layout in the product is the number of images to be used in the product, a disposition position of an image, and an image size, and the like.

The product created using the material images is provided to the user depending on an order or the like of the user. In the present embodiment, two types of products can be provided. One product is a first product that is repeatedly provided at fixed intervals over a plurality of periods. The first product is an edited image that is created by editing one or more material images, and in detail, is a photo book type product (in the drawing, represented by a reference sign F1) shown in FIG. 1.

In the present embodiment, the first product F1 is created for every fixed period, and specifically, is created every month. For example, in a case where the product providing service is used for one year, the first product F1 of each month is created, that is, the first products F1 for 12 months are provided to the user for one year. With this, the user can manage images captured in each month on a monthly basis, and can leave important images in a form of a product. Since the first product F1 can be provided cheaper than a second product F2 described below, the first product F1 is a product that is easily used (easily purchased) for the user.

Here, a plurality of months included in a service use period correspond to "a plurality of periods" of the present invention, and each month (that is, one month) corresponds to "one period". Hereinafter, the first product F1 that is created in a certain month is referred to as "a first product of a certain month" for convenience.

The first product F1 of each month is created using material images selected from an image group captured in the month (current month). In other words, in creating the first product F1 of each month, the user provided an image group captured by the user in the month. For example, in creating a first product of April, an image group captured by the user in April is provided by the user. A date of imaging of each image included in the image group can be specified from accessory information of the image, such as tag information of an Exchangeable image file format (Exif).

Hereinafter, an image group captured by the user in a certain month is referred to as "an image group of a certain month" for convenience.

As described above, in the present embodiment, processing of creating the first product F1 is executed every month. In detail, processing of acquiring an image group provided by the user, processing of selecting material images from the image group, and processing of determining a layout of the material images in the first product are repeated on a monthly basis. With this, the first product F1 can be provided every month. The user can confirm the first product F1 of the current month in the use period of the product providing service every month and can order a desired first product. The first product of the ordered month is provided to the user.

The user can perform a saving request to the first product of each month every month. The material images used for creating the first product to which the saving request is performed, in detail, the first product to be saved and the image layout in the first product to be saved are saved to a predetermined saving destination as a data file.

Another product is a second product in which images for 12 months provided by the user are recorded. Specifically, the second product is a composite image that is created using the material images used in the first product of each of the 12 months, and in detail, is an annual album type product (in the drawing, represented by a reference sign F2) shown in FIG. 2.

Figure 2:
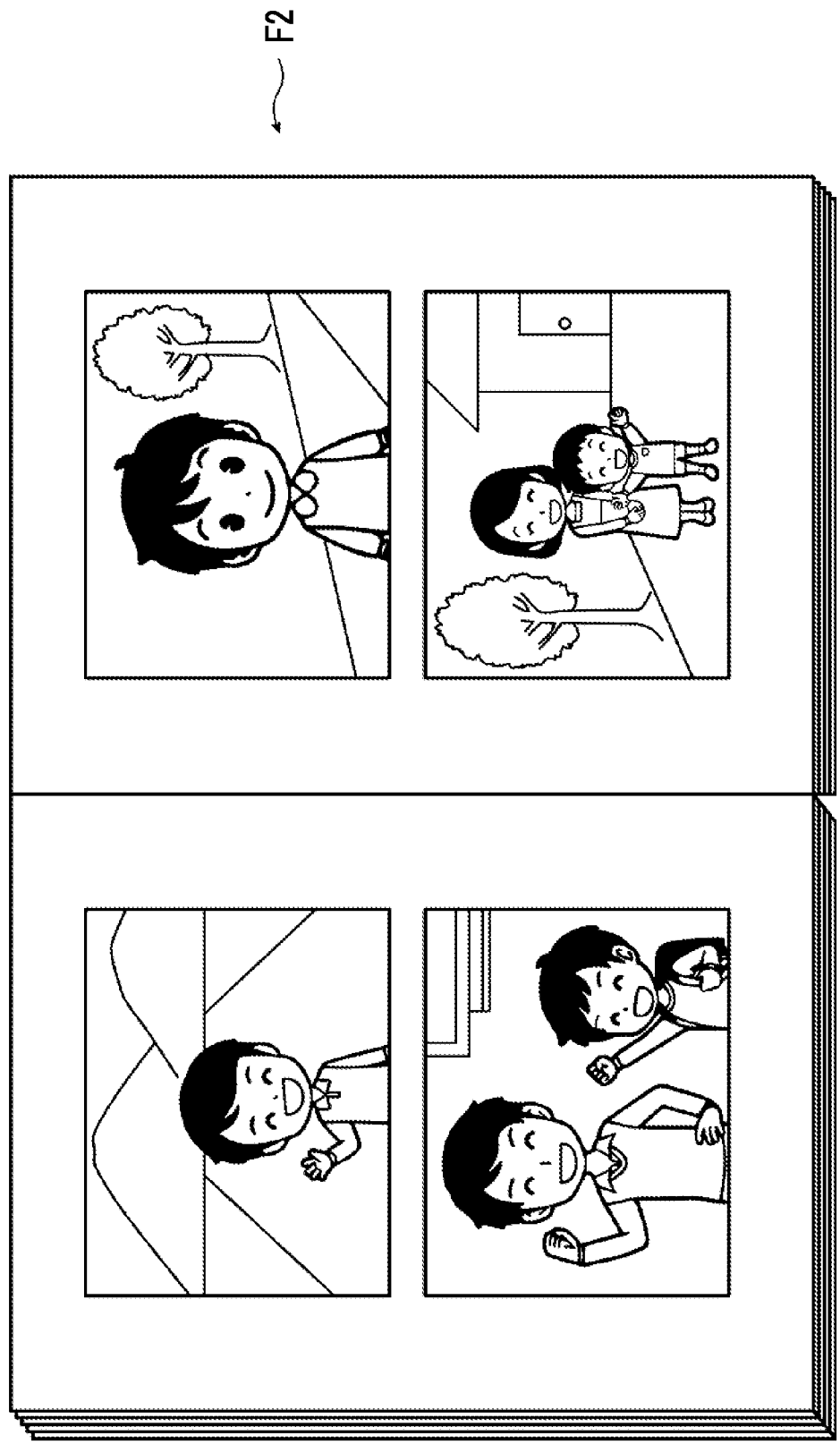
FIG. 2 is a diagram showing an example of a second product.

In the present embodiment, the second product F2 is created every 12 months, that is, on a yearly basis and is composed by collecting a plurality of pages as shown in FIG. 2. A plurality of pages included in the second product F2 correspond to a plurality of second product composition pieces. Each page of the second product F2 is composed of material images used in creating the first product of a month corresponding to the page. For example, on a page corresponding to April in the second product F2, material images used in creating the first product of April are disposed.

The second product F2 in which the images used in creating the first product of each month are recorded for the 12 months as described above is provided, whereby it is possible to allow the user to save important images among images captured over one year as an annual album.

The second product F2 is created when a plurality of periods (specifically, 12 months) have elapsed, for example, the last month in one year, and in detail, is created after the first product of the last month is created. The second product F2 created from the material images of the first products for the 12 months is provided to the user who orders the second product F2.

Configuration of Image Processing Apparatus According to Present Embodiment

Figure 3:
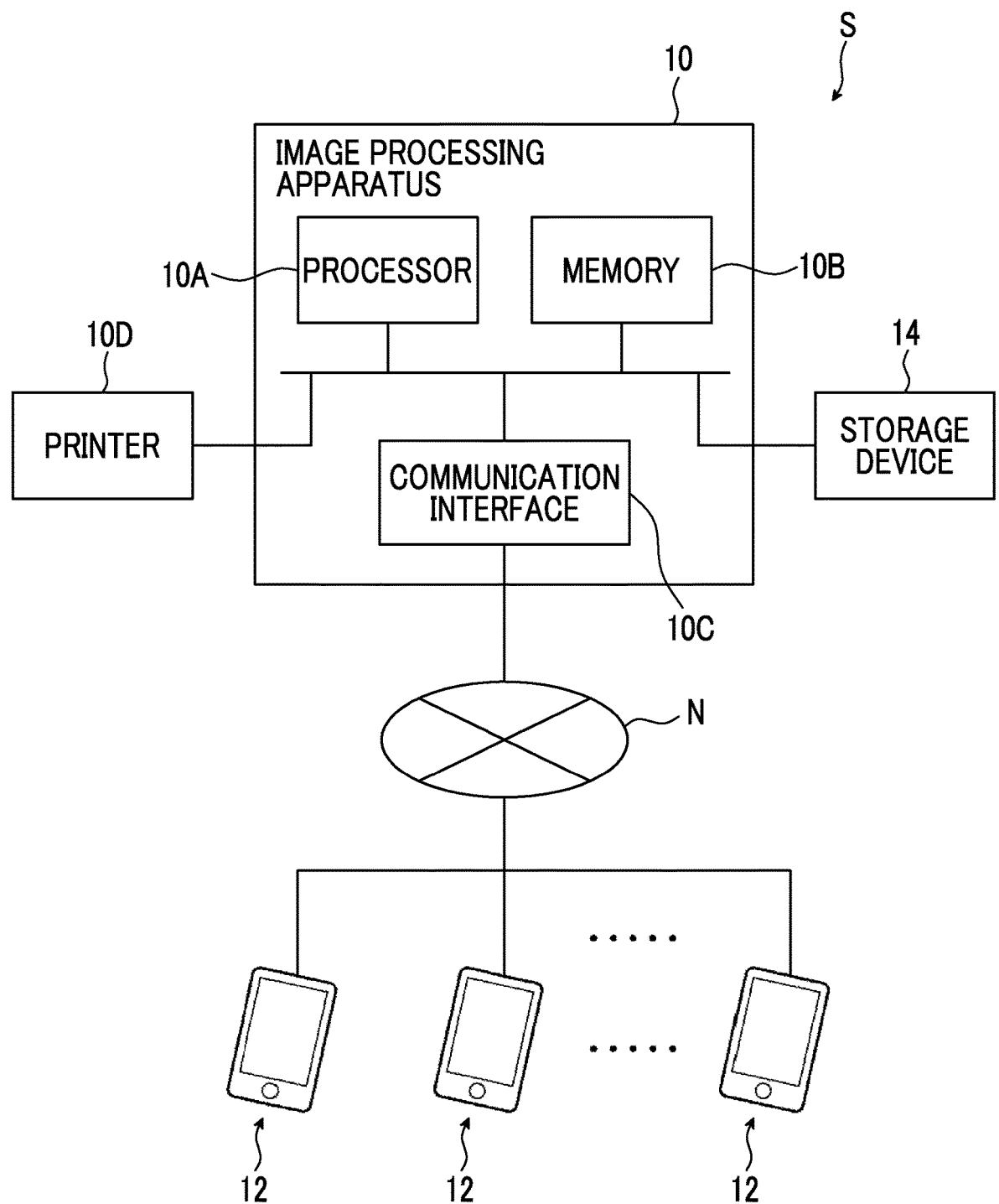
FIG. 3 is a diagram showing a product providing system including an image processing apparatus according to an embodiment of the present invention.

The above-described product providing service is realized by a product providing system S shown in FIG. 3. The product providing system S is configured with an image processing apparatus (hereinafter, referred to as an image processing apparatus 10) according to the present embodiment, and user-side equipment 12 that can perform communication with the image processing apparatus 10 through a network N.

User-Side Equipment

The user-side equipment 12 is configured with, for example, a personal computer (PC) that is used by the user to use the product providing service, and a communication terminal or a camera with a communication function. On a display of the user-side equipment 12, images provided to the image processing apparatus 10, information based on data provided from the image processing apparatus 10, and the like can be displayed. Information based on data provided from the image processing apparatus 10 includes image information of the first product F1 or the second product F2, and the like.

On the user-side equipment 12, a predetermined application program (hereinafter, referred to as a service application) is installed. The user can use the product providing service by starting the service application. Specifically, the user can perform various operations for the service through the user-side equipment 12 in a state in which the service application is started. Examples of the operations for service use include a service application operation, an image input operation, a layout edition operation, an order operation, and a saving request operation.

Figure 4:
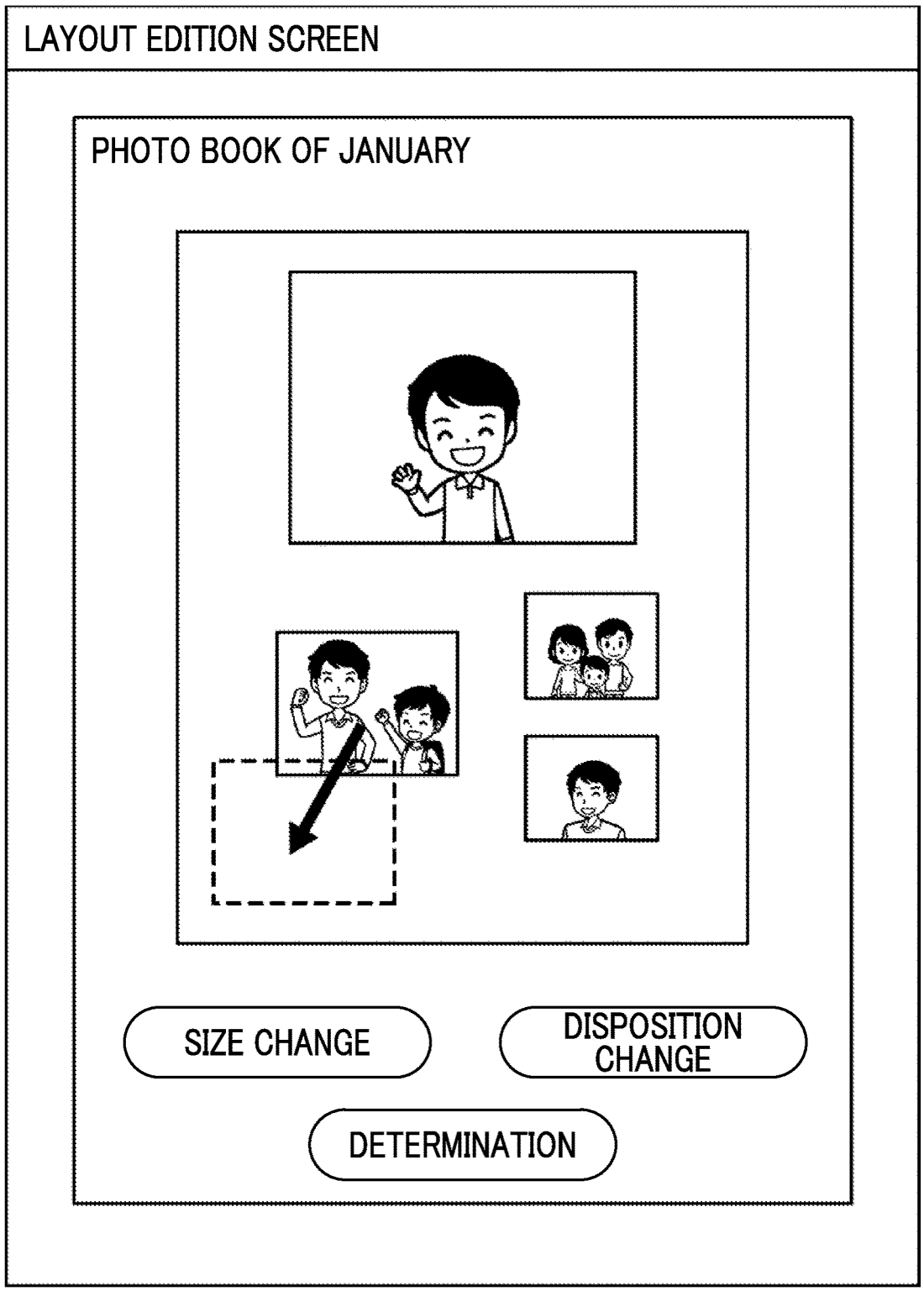
FIG. 4 is a diagram showing an example of a layout edition screen.

A procedure of each operation and a graphic user interface (GUI), such as an operation screen, are not particularly limited. An example of a GUI for the layout edition operation is a layout edition screen shown in FIG. 4.

The layout edition screen is drawn on the display of the user-side equipment 12, and images selected as images (that is, material images) for product creation are displayed on a screen for an edition operation. The user can perform the layout edition operation to a first product through the screen. For example, the user clicks each material image on the screen and drags the material image to a desired position on the screen. With this, the user can set or change a position or a size of each material image in the first product, that is, an image layout.

Figure 5:
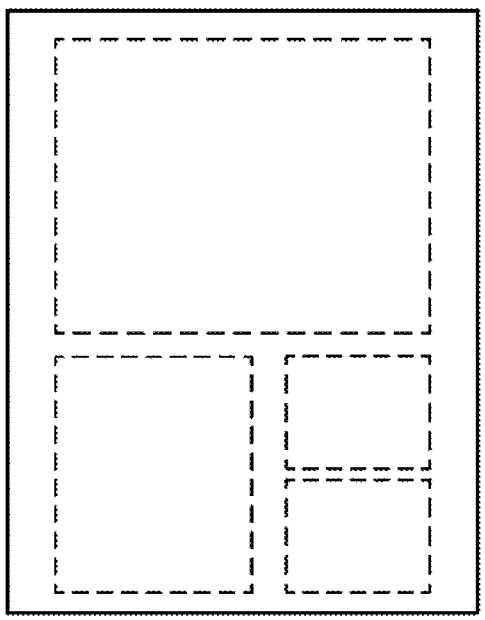
FIG. 5 is a diagram showing an example of a pattern of an image layout.
Figure 5:
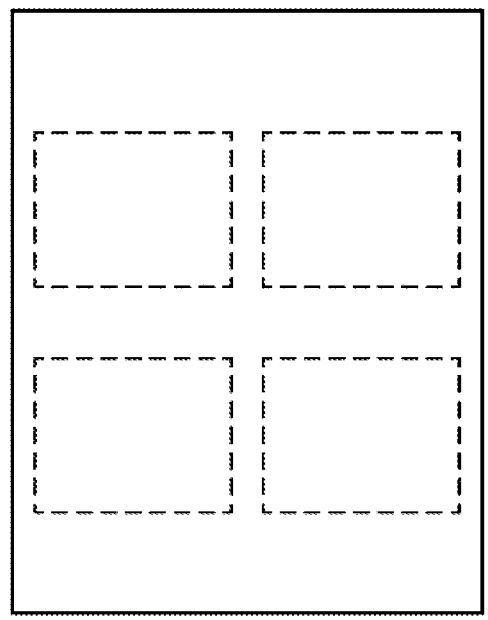
Figure 5:
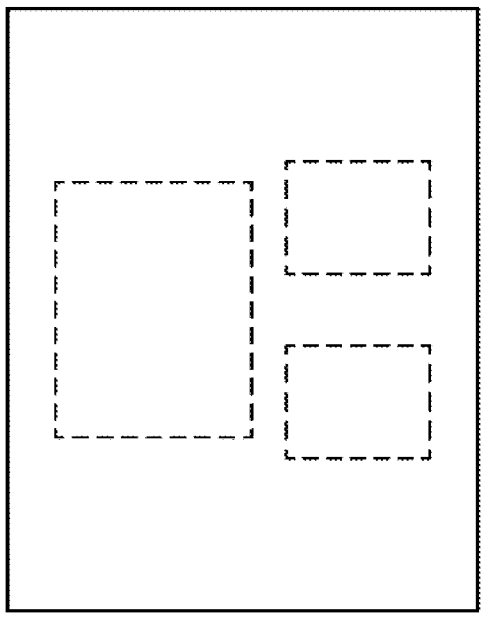
Figure 5:
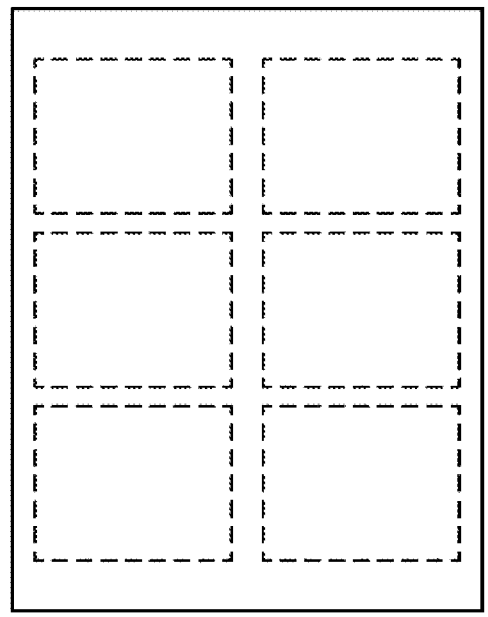

The image layout in the first product has an initial setting (default), and the user performs the layout edition operation, for example, in a case of changing the image layout from the initial setting. For the image layout, as shown in FIG. 5, several patterns may be prepared in advance. In this case, the user may select any one from among the plurality of patterns described above in performing the layout edition operation. FIG. 5 shows four patterns represented by #1 to #4, and in each pattern, a disposition position and a size of each material image in the first product are shown by a broken line.

In the layout edition operation, the user may select material images that are actually used in product creation, from among candidates of material images selected by the image processing apparatus 10.

Image Processing Apparatus

The image processing apparatus 10 is configured with a computer, for example, a server computer. The image processing apparatus 10 executes a series of data processing regarding the product providing service. The number of computers that configure the image processing apparatus 10 may be one or two or more. The image processing apparatus 10 is realized by a processor and a program that is executable by the processor, and is configured with, for example, a general-purpose computer. For example, the computer that configures the image processing apparatus 10 comprises a processor 10A, a memory 10B, and a communication interface 10C as shown in FIG. 3.

The processor 10A is configured with, for example, a central processing unit (CPU), a graphics processing unit (GPU), a digital signal processor (DSP), or a tensor processing unit (TPU).

The memory 10B is configured with, for example, a semiconductor memory, such as a read only memory (ROM) and a random access memory (RAM).

The communication interface 10C is configured with, for example, a network interface card or a communication interface board.

A printer 10D as output equipment may be connected to the image processing apparatus 10. The printer 10D receives printing data of a product created by the image processing apparatus 10 and operates depending on printing data to print (output) the product.

On the computer that configures the image processing apparatus 10, a program (hereinafter, referred to as a product providing program) for executing a series of processing regarding the product providing service is installed. The product providing program is a program that causes the computer to execute each step included in an image processing method of the embodiment of the present invention.

That is, the processor 10A reads out and executes the product providing program, whereby the computer comprising the processor 10A functions as the image processing apparatus of the embodiment of the present invention.

The product providing program may be read and acquired from a computer readable recording medium or may be received (downloaded) and acquired through a communication network, such as the Internet or an intranet.

The product providing system S is provided with, as shown in FIG. 3, a storage device 14 that stores image groups acquired from the user-side equipment 12 by the image processing apparatus 10. In the storage device 14, the image groups are accumulated. The image processing apparatus 10 is configured to freely read out images in the image groups stored in the storage device 14. Each image group accumulated in the storage device 14 is associated with the user as a providing source of the image group and year and month on which images included in the image group are captured.

The storage device 14 may be configured with a storage incorporated in or externally attached to the image processing apparatus 10. Alternatively, a third computer (for example, an external server) that can perform communication with the image processing apparatus 10 may configure the storage device 14.

Figure 6:
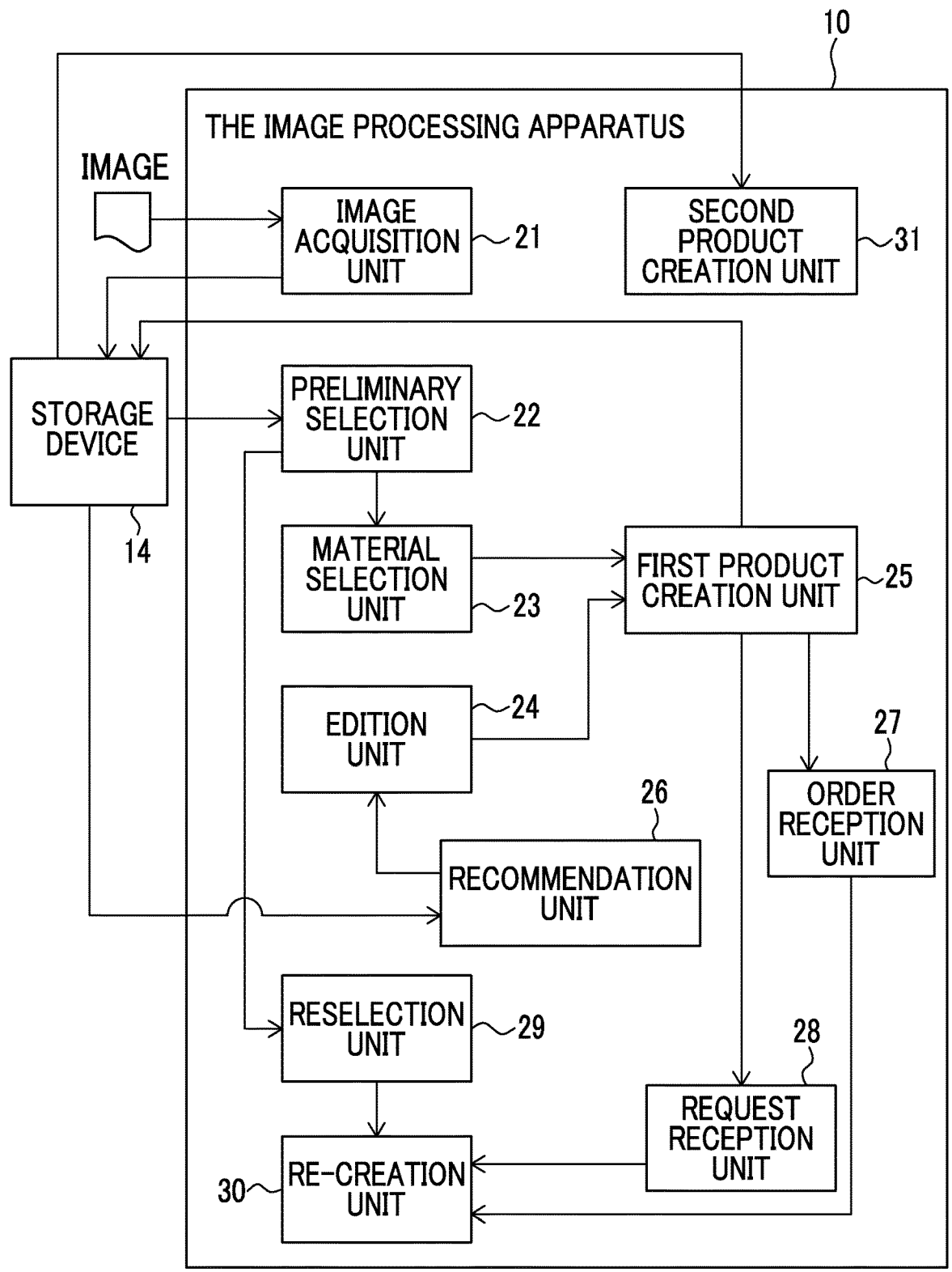
FIG. 6 is an explanatory view of functions of the image processing apparatus according to the embodiment of the present invention.

The configuration of the image processing apparatus 10 will be described again from a functional aspect. As shown in FIG. 6, the image processing apparatus 10 has an image acquisition unit 21, a preliminary selection unit 22, a material selection unit 23, an edition unit 24, a first production creation unit 25, a recommendation unit 26, an order reception unit 27, a request reception unit 28, a reselection unit 29, a re-creation unit 30, and a second product creation unit 31. The functional units are realized by cooperation of hardware equipment provided in the computer that configures the image processing apparatus 10 and software including the above-described product providing program.

The image acquisition unit 21 acquires the image groups provided by the user. Specifically, the user can designate images that are provided to the image processing apparatus 10, among images captured by the user and can transmit the designated images toward the image processing apparatus 10 by operating the user-side equipment 12. The image acquisition unit 21 receives the images transmitted from the user-side equipment 12 to acquire the image groups provided by the user. The image groups acquired by the image acquisition unit 21 are accumulated in the storage device 14.

In a case where the user-side equipment 12 is imaging equipment having a communication function, the image acquisition unit 21 may directly receive the images transmitted from the user-side equipment 12 to acquire the image groups. Alternatively, in a case where the user-side equipment 12 is a PC or the like in which image edition software is mounted, and fetches the images from imaging equipment, the image acquisition unit 21 may acquire the image groups fetched by the user-side equipment 12. In a case where the image groups input from the user-side equipment 12 are temporarily saved in a server or the like on a network, the image acquisition unit 21 may acquire the image groups from the server.

In each month, the image acquisition unit 21 acquires an image group of the month. That is, the image acquisition unit 21 acquires the image group of each month every month. A timing at which the image group of each month is acquired is not particularly limited, and for example, each time the user captures an image, the user may input the captured image at any time, and each time the image is input, the image acquisition unit 21 may acquire the input image. Alternatively, the user may collectively input images for every fixed period (for example, every month), and in this case, the image acquisition unit 21 may collectively acquire the images (image group) for one period input every month at one time.

Here, a certain month in the use period of the product providing service and a month different from the month correspond to a first period and a second period of the present invention. In the present embodiment, the second period is a period later than the first period, for example, a next month of a month corresponding to the first period. The image acquisition unit 21 acquires the image group of the month corresponding to the first period, and then, acquires the image group of the month corresponding to the second period. The image group of the month corresponding to the first period corresponds to a first image group of the present invention, and images included in the first image group correspond to first images. The image group of the month corresponding to the second period corresponds to a second image group of the present invention, and images included in the second image group correspond to second images.

The first period and the second period are a concept of a relative time and change with the lapse of time. For example, in a relationship of April and May, April corresponds to the first period, and May corresponds to the second period. In a relationship of April, May, and June, each of April and May corresponds to the first period, and June corresponds to the second period.

The month corresponding to the first period is not limited to a month immediately before the month corresponding to the second period, and may be a month before the month. For example, in a case where May is the second period, February or March may be the first period. The month corresponding to the first period may be a plurality of months (two or more months), and for example, in a case where May is the second period, March and April may be the first period.

The second period may be a period earlier than the first period, and for example, in a case where May is the first period, April may be the second period.

The preliminary selection unit 22 executes preliminary selection processing of excluding images (hereinafter, referred to images to be excluded) inappropriate as material images in an image group acquired by the image acquisition unit 21. Determination about whether or not an image corresponds to an image to be excluded is performed depending on the presence or absence of a face of a human in the image, an expression of the face, a size of the face occupied in the image, a degree of blurriness and shake in the image, a color and brightness of a subject, and the like.

The material selection unit 23, the edition unit 24, the first production creation unit 25, and the recommendation unit 26 execute processing (hereinafter, referred to as first creation processing) of creating a first product. The first creation processing is processing of creating the first product of each month and is executed every month. For example, the first creation processing is executed on a day corresponding to a predetermined date of each month.

The material selection unit 23 executes processing (hereinafter, referred to as material selection processing) of selecting images for use in creation of the first product, that is, material images. The material selection processing is processing included in the first creation processing and is executed every month. In the material selection processing of each month, the material selection unit 23 selects material images from an image group acquired by the image acquisition unit 21 in the month, that is, an image group captured in the month.

The material selection processing will be specifically described in connection with a case where a first product of a certain month (hereinafter, written as a P month) is created, as an example. In material selection processing of the P month, material images for use in the creation of the first product of the P month are selected from an image group of the P month, strictly, from an image group of the P month in which images to be excluded selected by the preliminary selection unit 22 are excluded.

In the material selection processing, the material selection unit 23 first specifies features of two or more items on images included in an image group of a P month. The two or more items are two or more items (themes) regarding capturing of an image. Examples of the items include a subject person, a proportion of the subject person occupied in an image, a part of the person shown in the image, another subject shown along with the person, an imaging scene, an imaging place, an imaging time, and a degree of perspective of the image.

The features are specific contents and properties of images regarding the items. Examples of the features on the items are as follows.

subject person: a relationship of a person (child, relative, friend, and the like), the number of persons in an image, and the like ratio of subject occupied in image: an occupancy ratio (%) of a subject in an image another subject shown along with person: a type of a subject, a size of the subject, and the like imaging scene: a classification of an imaging scene, content of an event shown in an image, and the like imaging place: a place name, a building name, information indicating whether an imaging place is indoor or outdoor, and the like imaging time: an imaging time (morning, daytime, evening, or night), a season in which imaging is performed, and the like degree of perspective: information indicating a short-range view or a distant view While a method of specifying features on items is not particularly limited, for example, features on items may be automatically specified using a known image analysis technique. Specifically, a face of a person in an image may be detected by applying a known face detection technique, and the detected face is collated with a face image registered in advance to specify a person the face of which is detected.

Alternatively, a subject in an image is detected by applying a known object detection technique, and then, a classification or the like of the detected subject may be estimated using an estimation engine constructed by machine learning. When an image group provided by the user is analyzed, in a case where there are a predetermined number of images in which the same person is shown, it may be supposed that the person is an important person (a family, a friend, or the like) for the user. A relationship of a person shown in an image and the user may be supposed from an imaging place, an imaging time, an imaging scene, or the like of the image.

Alternatively, information regarding a feature of a target image may be input by an operator of the image processing apparatus 10 or the user who provides the image, and the feature of the target image may be specified based on the input information.

The material selection unit 23 selects the material images depending on features of images included in the image group of the P month in selecting the material images for use in the creation of the first product of the P month from the image group of the P month.

The material selection unit 23 selects material images for use in creation of a first product of a month later than the P month, for example, a Q month that is a next month of the P month, from an image group of the Q month. In this case, the material selection unit 23 selects the material images for use in the creation of the first product of the Q month depending on features of images included in the image group of the Q month and features of the material images used in the creation of the first product of the P month.

Hereinafter, the material images used in the creation of the first product of the P month are referred to as "the material images of the P month", and similarly, the material images for use in the creation of the first product of the Q month are referred to as "the material images of the Q month". Here, the P month and the Q month have a relationship between the first period and the second period described above, the image group of the P month corresponds to the above-described first image group, and the image group of the Q month corresponds to the above-described second image group.

In the present embodiment, the material selection unit 23 can select the material images of the Q month such that a difference occurs between the material images of the P month and the material images of the Q month in terms of features.

The edition unit 24 receives the layout edition operation of the user, in detail, receives data indicating the content of the layout edition operation from the user-side equipment 12. The edition unit 24 is configured to receive the layout edition operation each time the first creation processing is executed, in other words, every month. In the present embodiment, there is the initial setting (default layout) of the layout, and the user performs the layout edition operation in a case of desiring a layout other than the initial setting. In the layout edition operation, an operation to select images that are actually used in the creation of the first product, from the material images selected by the material selection unit 23 may be included.

The first production creation unit 25 creates the first product of each month every month based on the material images selected by the material selection unit 23 and the layout edition operation received by the edition unit 24. Specifically, the first production creation unit 25 executes processing (hereinafter, referred to as layout determination processing) of determining the layout of the material images in the first product based on the layout edition operation. In the layout determination processing, a size, a disposition position, and the like are determined for the material images of the first product.

Then, the image layout in the first product of the current month is determined, whereby the first product F1 of the month is completed. The first production creation unit 25 generates a data file of the first product with the completion of the first product. The generated data file of the first product is transmitted to the user-side equipment 12. In the user-side equipment 12, an image of the first product is displayed based on the received data file. With this, the user can confirm the first product F1 of each month.

The recommendation unit 26 recommends (suggests) a recommended layout to the user in the first creation processing. The recommended layout is set while reflecting an image layout of the first product created before a past month. For example, it is assumed that the image layout in the first product of the P month is changed from the layout of the initial setting based on the layout edition operation of the user. In this case, the recommendation unit 26 recommends the image layout in the first product of the P month as a recommended layout to the user in the first creation processing of creating the first product of the Q month as the next month of the P month. Description will be provided in connection with a specific example. It is assumed that the user selects the pattern #1 in FIG. 5 in creating the first product of April. In this case, the recommendation unit 26 suggests the pattern #1 as a recommended layout to the user in creating the first product of May.

The order reception unit 27 is configured to receive an order of the user to the first product, in detail, receives data indicating an order content from the user-side equipment 12 in a case where the user performs an order operation on the user-side equipment 12. In the present embodiment, since the first product is created every month, the order reception unit 27 can receive an order every month. In a case where the order reception unit 27 receives an order, processing (for example, printing processing) for providing an ordered first product to the user is executed. For the ordered first product F1, when the order is received, the material images that compose the first product and the image layout in the first product are determined.

The request reception unit 28 is configured to receive a saving request of the user to the first product, in detail, receives data indicating a request content from the user-side equipment 12 in a case where the user performs a saving request operation on the user-side equipment 12. In the present embodiment, in a case where the first product is created every month, the request reception unit 28 can receive a saving request every month. In a case where the request reception unit 28 receives a saving request, the data file of the first product to which the saving request is performed is saved in the storage device 14 in association with the user who performs the saving request.

The reselection unit 29 and the re-creation unit 30 execute re-creation processing of re-creating a first product of a target month after first creation processing of creating the first product of the target month is executed. The target month is a month to be a target of re-creation processing, that is, a month the created first product of which is created again. The re-creation processing is executed in a case where a predetermined condition (hereinafter, referred to as a re-creation condition) is satisfied.

In the present embodiment, in a case where an order or a saving request to the first product of the target month is not received, the re-creation processing of re-creating the first product of the target month is executed. In other words, in a case where an order or a saving request to the first product of the target month is received, the re-creation processing of re-creating the first product of the target month is not executed. That is, the need of the re-creation processing is determined depending on an intention of the user to the first product, specifically, the presence or absence of an order or a saving request. Then, the first product to which an order or a saving request is performed can be determined, and an undetermined first product can be re-created.

The re-creation processing of re-creating the first product of the target month is executed in a month later than the target month. For example, in a case where the target month is April, the re-creation processing of re-creating the first product of the month (April) is executed after May. Unless an order or a saving request to the first product (including the re-created first product) of the target month is received, the re-creation processing of re-creating the first product of the target month is repeatedly executed in each month after the target month.

The reselection unit 29 executes reselection processing of selecting material images for use in re-creating the first product of the target month. In the reselection processing, the reselection unit 29 reselects material images from an image group captured in a period (hereinafter, referred to as a reselection period) of two month or more including the target month and a month later than the target month. In this case, the reselection unit 29 selects the material images based on a trend of features of the image group captured in the reselection period.

The re-creation unit 30 re-creates the first product of the target month using the material images selected by the reselection unit 29. A procedure in which the re-creation unit 30 re-creates the first product is the same as a procedure in which the first production creation unit 25 creates the first product.

The second product creation unit 31 uses the material images used in the creation of each of the first products for the 12 months and executes second creation processing of creating an annual second product F2. In the present embodiment, after the first creation processing of creating the first product of the last month in one year ends, the second creation processing for the year is executed.

In the second creation processing, the second product creation unit 31 creates each of a plurality of pages included in the second product F2 using the material images used in the creation of the first product F1 of the month corresponding to each page. In this case, the second product creation unit 31 sets a layout of the material images in each page depending on the presence or absence of an order to the first product F1 of the month corresponding to each page. Specifically, the second product creation unit 31 sets the image layout in each page such that material images of a first product of an ordered month are given priority over material images of a first product of a non-ordered month to which an order is not performed.

Then, the image layout of each page is determined, whereby the second product F2 is completed. With the completion of the second product, the second product creation unit 31 generates a data file of the second product. The generated data file is transmitted to the user-side equipment 12. In the user-side equipment 12, an image of the second product is displayed on the received data file. With this, the user can confirm the second product F2.

Basic Processing Flow of Image Processing Apparatus

Figure 7:
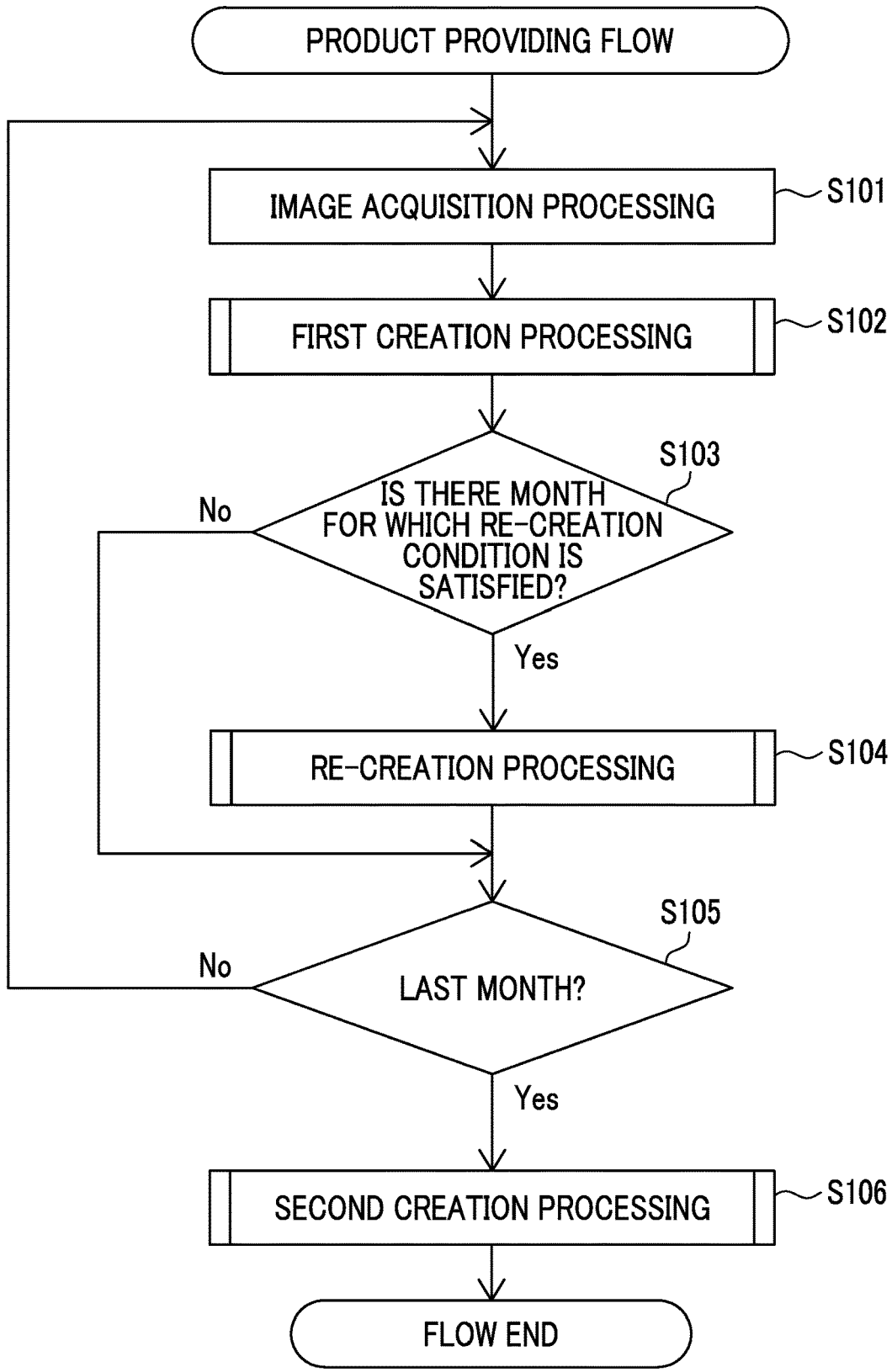
FIG. 7 is a diagram illustrating a basic processing flow of the image processing apparatus according to the embodiment of the present invention.

A product providing flow that is a basic processing flow by the image processing apparatus 10 according to the present embodiment will be described referring to FIG. 7.

The product providing flow is executed in a one-year cycle in the use period of the product providing service. Each step in the product providing flow is executed by the processor 10A of the computer that configures the image processing apparatus 10. That is, the processor 10A reads out the above-described product providing program to execute each step, whereby the product providing flow proceeds.

In the product providing flow, the processor 10A executes image acquisition processing of acquiring an image group captured in each month by the user every month (S101). In the image acquisition processing, the processor 10A receives images input from the user-side equipment 12 to acquire the image group captured in each month by the user. An image input from the user may be performed each time the user captures an image. Alternatively, on a predetermined day of each month, an image group captured in the month may be collectively provided.

Thereafter, on a predetermined day of each month, the processor 10A executes the first creation processing of creating the first product F1 of the current month (S102). In the first creation processing, the processor 10A executes material selection processing of selecting material images from the image group acquired in Step S101 and layout determination processing of determining a layout for the selected material images.

In a case where there is a month for which a re-creation condition is satisfied, among the months before a past month (S103), the processor 10A executes re-creation processing with the month as a target month (S104). In the re-creation processing, the processor 10A executes reselection processing of selecting material images for use in re-creating the first product of the target month from the image group of the target month.

The series of Steps S101 to S104 described above is repeatedly executed every month until the last month comes. Among a plurality of kinds of image acquisition processing that are executed every month, the image acquisition processing that is executed in an earlier month (first period) corresponds to the first acquisition processing, and the image acquisition processing that is executed in a later month (second period) corresponds to the second acquisition processing. For example, in the relationship of April and May, the image acquisition processing that is executed in April corresponds to the first acquisition processing, and the image acquisition processing that is executed in May corresponds to the second acquisition processing.

In a case where the last month comes (S105), the processor 10A creates the first product of the last month, and then, executes second creation processing of creating the second product F2 as an annual album (S106). Then, when the second creation processing ends, the execution of the product providing flow in the year ends.

First Creation Processing

Figure 8:
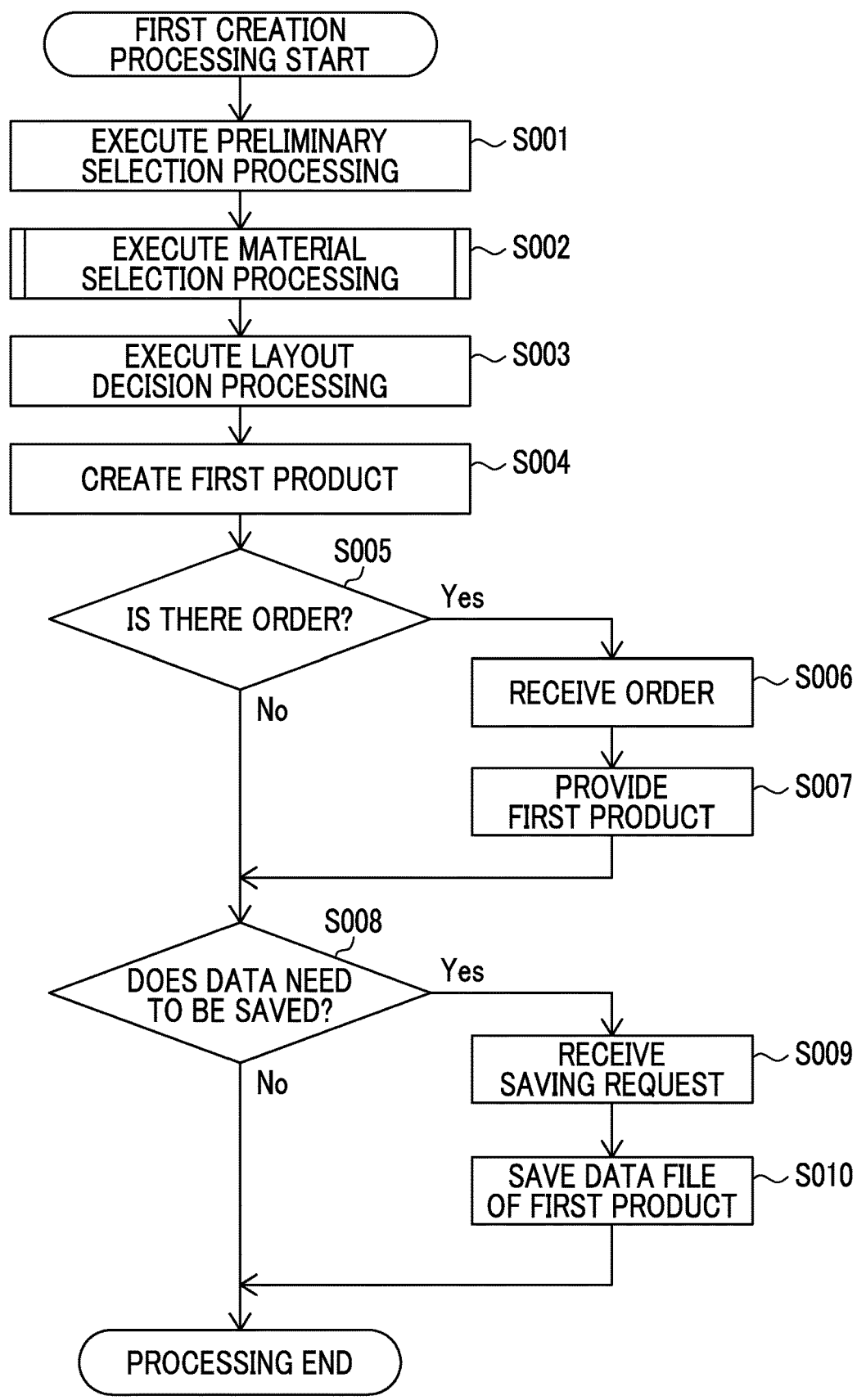
FIG. 8 is a diagram illustrating a flow of first creation processing.

Next, a flow of the first creation processing in the product providing flow will be described referring to FIG. 8. In the first creation processing, the image processing method of the embodiment of the present invention is employed. That is, each step in the first creation processing described below corresponds to a constituent element of an image processing method of the embodiment of the present invention.

The flow of the first creation processing described below is merely an example, and unnecessary steps may be deleted, new steps may be added, and an execution order of the steps may be changed without departing from the spirit of the present invention.

Each step in the first creation processing is executed by the processor 10A of the computer that configures the image processing apparatus 10. Hereinafter, the first creation processing of creating the first product F1 of the P month or the Q month will be described as an example.

In executing the first creation processing of creating the first product of the P month, the processor 10A executes the image acquisition processing of acquiring the image group of the P month from the user. The processor 10A executes preliminary selection processing to the acquired image group of the P month (S001). With the execution of the preliminary selection processing, images inappropriate as material images for product creation are excluded as images to be excluded from the image group of the P month. The images to be excluded are, for example, images that do not satisfy given image quality, such as images with shake or blurriness and images in which brightness of a subject is not sufficiently secured.

In a case where the first creation processing of creating the first product of the P month is started, the processor 10A executes the material selection processing (S002). In the material selection processing, the processor 10A selects material images (material images of the P month) for use in creating the first product of the P month from the image group of the P month in which the images to be excluded are excluded. A detailed procedure and the like of the material selection processing will be described below in detail.

Next, the processor 10A executes the layout determination processing and determines the layout of the material images in the first product of the P month (S003). Specifically, the processor 10A determines the disposition position, the size, and the like in the first product of the P month for each of the material images of the P month selected in the material selection processing. In a case where the user performs the layout edition operation to the first product of the P month, the processor 10A receives the operation. In this case, the processor 10A determines the image layout depending on the received layout edition operation.

After the layout determination processing, the processor 10A creates the first product of the P month based on the material images selected in the material selection processing and the image layout determined in the layout determination processing (S004). The processor 10A generates the data file of the first product with the completion of the first product of the P month and transmits the data file to the user-side equipment 12. In the user-side equipment 12, an image of the first product of the P month is displayed on the display. The user confirms the first product of the P month and examines a need of an order (S005).

In a case where the user operates the user-side equipment 12 to perform an order to the first product of the P month, the processor 10A receives the order (S006), and executes processing (for example, printing processing) for providing the first product of the P month to the user (S007). With the reception of the order, the processor 10A determines the first product (in detail, the material images and the image layout used in the creation of the first product of the P month) of the P month.

The user examines a need of saving for the data file of the first product of the P month (S008). In a case where the user operates the user-side equipment 12 to perform a saving request, the processor 10A receives the saving request (S009), and saves the data file of the first product of the P month in the storage device 14 (S010).

When the series of steps described above ends, the first creation processing of creating the first product of the P month ends.

For the Q month as the next month of the P month, the first creation processing is executed following the same flow as described above.

It is assumed that the image layout in the first product of the P month is determined depending on the layout edition operation of the user. In this case, the processor 10A suggests the image layout in the first product of the P month as a recommended layout to the user in the first creation processing of creating the first product of the Q month. The user determines whether or not to employ the suggested recommended layout and performs an operation depending on the determination on the user-side equipment 12. The recommended layout is suggested in this way, whereby it is possible to support the layout edition operation of the user. Then, in a case where the user employs the recommended layout, the processor 10A creates the first product of the Q month based on the suggested recommended layout.

Material Selection Processing

Figures 9, 10:
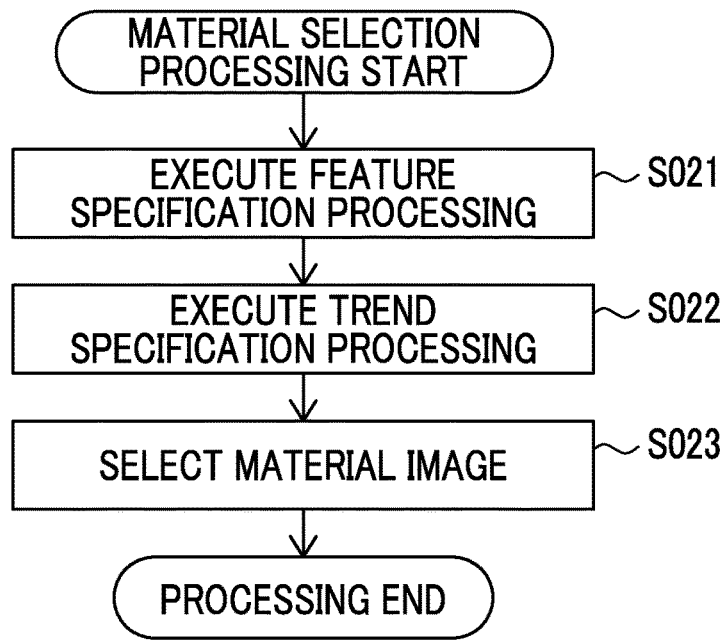
FIG. 9 is a diagram illustrating a flow of material selection processing.
FIG. 10 is an explanatory view of images included in an image group of a certain month.

Next, a flow of the material selection processing in the first creation processing will be described referring to FIG. 9. The material selection processing is executed in the first creation processing of each month, that is, is executed every month. In the material selection processing of each month, as shown in FIG. 9, the processor 10A executes feature specification processing (S021), trend specification processing (S022), and selection processing (S023).

The contents of the three kinds of processing described above are different between the first month in the use period of the product providing service and a month later than the first month. Hereinafter, the material selection processing of the first month and the material selection processing after the first month will be described.

Hereinafter, a case where the first month is April and the month later than the first month is May will be described as an example.

Material Selection Processing of First Month

In the material selection processing of April as the first month, the material images (the material images of April) for use in the creation of the first product of April are selected from the image group of April. In the material selection processing of April, first, the feature specification processing is executed. In the feature specification processing, the processor 10A specifies features on two or more items for the images included in the image group of April. Although the number and the types of items are not particularly limited, hereinafter, description will be provided assuming a case where three items "subject person", "imaging place", and "imaging time" are set.

The features that are specified on each item will be described. For example, as a feature on the item "subject person", a relationship (specifically, child, parents, grandparents, or the like) of a person shown in image is specified. As a feature on the item "imaging place", a specific name (place name) of an imaging place, such as home or park) is specified. As a feature on the item "imaging time", a specific time or a time period, such as morning, afternoon, or night, is specified.

A method of specifying a feature may be a method of automatically specifying a feature through image analysis or may be a method of manually inputting information indicating a feature.

In the trend specification processing of the material selection processing of April, the processor 10A specifies a trend of the features of the images included in the image group of April for three items based on the features specified in the feature specification processing. The trend indicates how many images having a feature are included in the image group.

The trend specification processing will be described in more detail. In the trend specification processing, the processor 10A classifies the images included in the image group of April into a plurality of classifications based on the features specified in the feature specification processing for each of the three items. The classification is a classification (category) in classifying images having a certain feature. For example, for the item "imaging place", there are a classification of images captured at home, a classification of images captured at a park, and the like.

One image may belong to a plurality of classifications for a certain item. For example, an image in which a child and a mother are shown together belongs to a classification of "an image in which a child is shown" and belongs to a classification of "an image in which a mother is shown", for the item "subject person".

The processor 10A calculates a ratio of images belonging to each classification for every classification for each item. The ratio is represented by a proportion (a unit is %) of the number of images belonging to each classification to the image group of April. Then, the ratio calculated for every classification for each item corresponds to the trend of the features of the images included in the image group of April.

An example of the ratio calculated for the images included in the image group of April is shown in FIG. 10. In regard to the image group of April, as shown in FIG. 10, for example, for the item "subject person", a ratio of images in which a child is shown is 40%, a ratio of images in which a mother is shown is 40%, and a ratio of images in which a father is shown is 40%. For the item "imaging place", a ratio of images captured at home is 80%, and a ratio of images captured at a park is 20%.

The processor 10A executes the selection processing of April after executing the feature specification processing and the trend specification processing. In the selection processing of April, the processor 10A selects the material images (the material images of April) for use in the creation of the first product of April from the image group of April in which the images to be excluded are excluded. In this case, the processor 10A selects the material images of April based on the trend specified in the trend specification processing.

Specifically, the processor 10A selects images of a classification having a high ratio for each item as material images with priority. In the case of FIG. 10, images of a classification having the highest ratio for each item, for example, "images in which a child is shown and which is captured at home" are selected as material images with priority. In the images that are selected as the material images, images belonging to a classification other than the classification having the highest ratio may be included at a proportion depending on the ratio of the classification.

With the above-described procedure, the material images of April are selected. The material images are images selected while reflecting a preference, an interest, and the like of the user. That is, the ratio that is calculated for each item is determined depending on an imaging trend of the user as an image provider, and images of a classification having a high ratio are highly likely to correspond to images that are preferred by the user or images that are considered important by the user. Accordingly, in a case where the material images are selected by the above-described procedure, images that are important for the user can be selected as material images.

Material Selection Processing of Month After First Month

In the material selection processing of May as an example of the month after the first month, the material images (the material images of May) for use in the creation of the first product of May are selected from the image group of May. In the material selection processing of May, the material images of May are selected in consideration of the material images of April. Here, in the relationship of April and May, April corresponds to a first period, and May corresponds to a second period. The image group of April corresponds to a first image group, and the images included in the image group correspond to first images. That is, the material images of April correspond to first images used in product creation. The image group of May corresponds to a second image group, and images included in the image group correspond to second images. That is, the material images of May correspond to second images for product creation.

Figure 11:
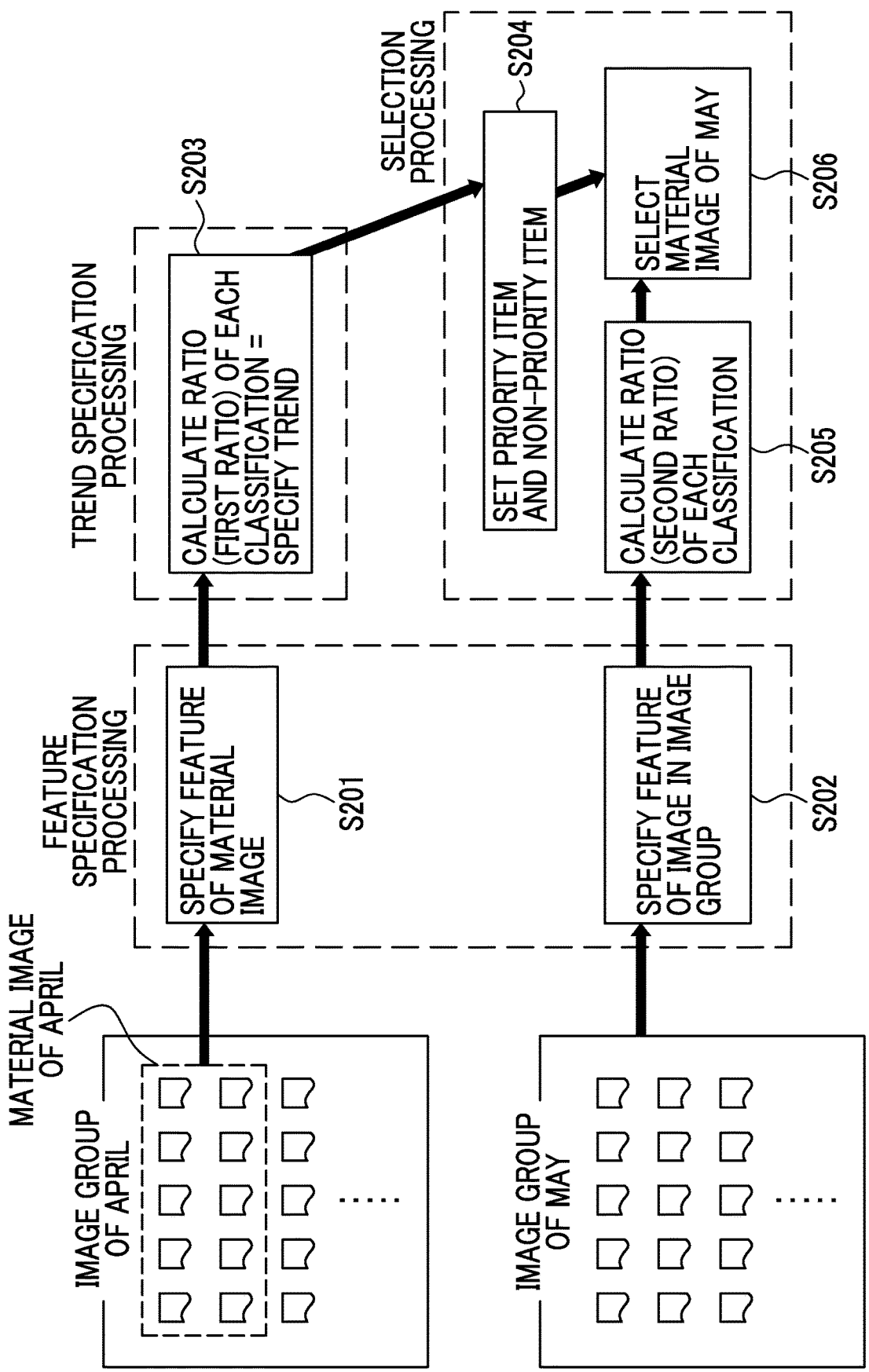
FIG. 11 is a diagram illustrating a procedure of material selection processing of a month after a first month.

The material selection processing of May proceeds following a flow shown in FIG. 11. In the feature specification processing of the material selection processing of May, the processor 10A specifies features on the above-described three items for the material images of April and the images included in the image group of May (S201, S202). A point and a procedure for specifying a feature of an image are the same as in the feature specification processing of the material selection processing of April.

In the subsequent trend specification processing, the processor 10A specifies the trend of the features of the material images of April for the above-described three items (S203). Specifically, in the trend specification processing, the processor 10A classifies the material images of April into a plurality of classifications based on the features for each item. Thereafter, the processor 10A calculates a ratio of images (material images) belonging to each classification for every classification. The ratio corresponds to a first ratio and is represented by a proportion (a unit is %) of the number of images belonging to each classification to the total number of the material images of April. Then, the first ratio that is calculated for every classification for each item corresponds to the trend of the features of the material images of April, that is, the trend of the features of the first images used in product creations.

Hereinafter, the trend of the features of the material images of April is referred to as "the trend of April".

Figures 12, 13:
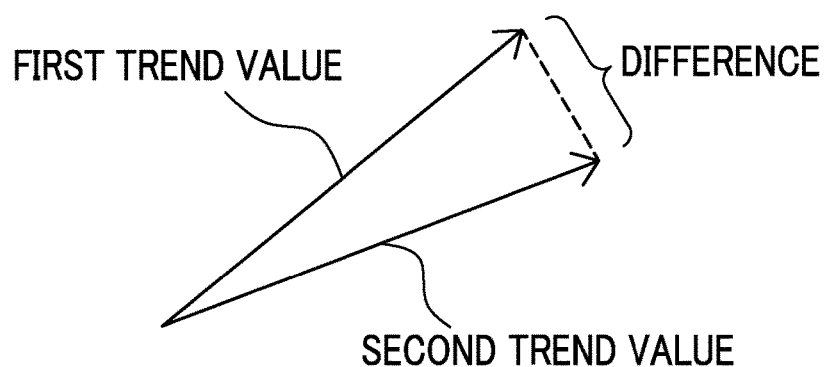
FIG. 12 is an explanatory view of each of an image group of a certain month, a material image of the certain month, and an image group of a next month.
FIG. 13 is a diagram showing a first trend value and a second trend value.

An example of the first ratio calculated for the material images of April is shown in FIG. 12. In regard to the material images of April, as shown in FIG. 12, for example, for the item "subject person", a first ratio of images in which a child is shown is 90%, a first ratio of images in which a mother is shown is 30%, and a first ratio of images in which a father is shown is 10%. For the item "imaging place", a first ratio of images captured at home is 90%, and a first ratio of images captured at a park is 10%. For the item "imaging time", a first ratio of images captured in the morning is 40%, a first ratio of images captured in the afternoon is 60%, and a first ratio of images captured at night is 0%.

In the trend specification processing, the processor 10A obtains a first trend value obtained by digitalizing the trend of April. Digitalizing the trend includes deriving a vector indicating the trend. Specifically, when the number of items is C, and the number of classifications included in each item is D, the first trend value is expressed by a multidimensional vector having a C×D dimension. Each component of the multidimensional vector forming the first trend value corresponds to a first ratio of images belonging to a classification corresponding to the component for an item corresponding to the component.

The processor 10A executes the selection processing of May after executing the feature specification processing and the trend specification processing. In the selection processing of May, the processor 10A selects the material images of May from the image group of May based on features of the images included in the image group of May. In the present embodiment, the processor 10A selects images (second images) having a feature inconsistent from the trend of April for a part of items among the above-described three items as the material image of May.

In detail, the processor 10A sets a priority item from among the three items, and sets an item other than the priority item as a non-priority item (S204). The priority item is an item that is given priority in selecting the material images of May, among the three items, and is set depending on the trend of April, for example. Specifically, a classification having the highest first ratio or a classification having the first ratio higher than a reference value is specified, and an item corresponding to the classification is a priority item. In the case shown in FIG. 12, since a classification having the highest first ratio is images in which a child is shown, the item "subject person" is a priority item.

The priority item is not limited to one item, and a plurality of items may be set as a priority item. A way of determining a priority item is not particularly limited, and for example, the user may designate a priority item.

The non-priority item corresponds to "a part of items" in the present invention, and in the case shown in FIG. 12, the items "imaging place" and "imaging time" correspond to a non-priority item.

Next, the processor 10A classifies the images included in the image group of May into a plurality of classifications based on the features for the above-described three items, and calculates a ratio of images belonging to each classification for every classification (S205). The ratio corresponds to a second ratio and is represented by a proportion (a unit is %) of the number of images belonging to each classification to the number of images included in the image group of May.

An example of the second ratio calculated for the images included in the image group of May is shown in FIG. 12. In regard to the image group of May, as shown in FIG. 12, for example, for the item "subject person", a second ratio of images in which a child is shown is 90%, a second ratio of images in which a mother is shown is 35%, and a second ratio of images in which a father is shown is 10%. For the item "imaging place", a second ratio of images captured at home is 30%, and a second ratio of images captured at a park is 70%. For the item "imaging time", a second ratio of images captured in the morning is 40%, a second ratio of images captured in the afternoon is 60%, and a second ratio of images captured at night is 0%.

Thereafter, the processor 10A selects the material images of May based on the second ratio calculated for every classification for the images included in the image group of May and the first trend value indicating the trend of April (S206). In this case, the processor 10A selects images having a feature consistent with the trend of April for the priority item and a feature inconsistent with the trend of April for the non-priority item, in the image group of May as the material image of May.

The images having the feature consistent with the trend of April for the priority item are determined depending on the first ratio calculated for every classification for the priority item, and correspond to images of a classification having the highest first ratio for the priority item. In the case shown in FIG. 12, images in which a child is shown are images having a feature consistent with the trend of April for the priority item.

The images having the feature consistent with the trend of April for the priority item are not limited to the images belonging to the classification having the highest first ratio, and may be, for example, images belonging to any one of classifications up to a classification having the n-th (where n is a natural number equal to or greater than 2) highest first ratio in a descending order.

On the other hand, the images having the feature inconsistent with the trend of April for the non-priority item are determined depending on the first ratio and the second ratio calculated for every classification for the non-priority item. Specifically, images belonging to a classification in which the second ratio calculated for the non-priority item increases more than the first ratio correspond to the images having the feature inconsistent with the trend of April for the non-priority item. In the case shown in FIG. 12, for the non-priority item "imaging place", a second ratio of images captured at a park is 70% and increases more than the first ratio 10%. For this reason, the images captured at the park correspond to images having the feature inconsistent with the trend of April for the non-priority item.

Among the images belonging to the classification in which the second ratio calculated for the non-priority item increases more than the first ratio, images belonging to a classification with a difference between the second ratio and the first ratio greater than a threshold value may be selected as material images.

For the non-priority item, in a case where there are a plurality of classifications in which the second ratio increases more than the first ratio, an evaluation value for images belonging to each classification may be calculated for every classification. The evaluation value is a total value of a value calculated depending on image quality of an image, the number of persons in the image, and whether or not a specific person is in the image, and a value determined depending on the second ratio. The processor 10A may give priority to a classification to which an image having a high evaluation value belongs, among the plurality of classifications, and may select images belonging to the classification as material images.

The processor 10A uses the first trend value indicating the trend of April in selecting the images having the feature inconsistent with the trend of April for the non-priority item. Specifically, the processor 10A selects the material images of May such that a difference between a second trend value obtained by digitalizing the features of the material images of May and the first trend value is equal to or greater than a set value.

As shown in FIG. 13, like the first trend value, the second trend value is expressed by a multidimensional vector having multiple dimensions obtained by multiplying the number of items C and the number of classifications D included in each item. Each component of the multidimensional vector forming the second trend value corresponds to a second ratio of the images belonging to a classification corresponding to the component for an item corresponding to the component. The difference between the second trend value and the first trend value is an absolute value of a difference between two vectors, as shown in FIG. 13. The set value that is set to the difference may be a value determined in advance or may be set by the user and may be appropriately changed.

According to the above-described point, the images having the feature inconsistent with the trend of April can be accurately selected from the image group of May. That is, in the present embodiment, the processor 10A digitalizes the trend of April and the trend of the features of the images selected as the material image of May and executes arithmetic processing using the digitalized two trends. With the arithmetic processing, the images having the feature inconsistent with the trend of April can be derived reasonably and appropriately.

With the above-described procedure, the processor 10A selects the material images of May from the image group of May. Here, the images that are selected as the material images of May are selected in consideration of the material images of April, and specifically, have the feature consistent with the trend of April for the priority item and have the feature inconsistent with the trend of April for the non-priority item. As a result, the images that are used in the creation of the first product of May (current month) can be appropriately selected based on the images used in product creation of April (past month).

In more detail, the features of the images regarding the priority item are highly likely to be contents (theme) that the user gives priority in the creation of the first product. Based on the fact, in a case where the images having the feature consistent with the trend of April for the priority item are selected as the material image of May, material images that match a preference, an interest, or the like of the user can be selected.

On the other hand, in a case where there are little changes between the features of the material images of May and the features of the material images of April, the first product of April and the first product of May are products having similar trends. In a case where such a situation continues in the first products of subsequent months, even though the first product is created every month, the features of the images included in the first product, that is, the material images are monotonous. As a result, the first product of every month is likely to be short of variation.

Accordingly, in the present embodiment, the images having the feature inconsistent with the trend of April for the non-priority item are selected as the material images of May. With this, the features of the images (material images) for product creation are different between the first product of May and the first product of April. As a result, for the first product that is created every month, variation is abundant, and it is possible to restrain the first product from being monotonous (having no big change) for the user. With such an effect, it is expected that the users who use the product providing service for providing the first product every month increase.

In the case shown in FIG. 12, the priority item is "subject person", and the non-priority item is "imaging place". Then, as the images having the feature consistent with the trend of April for the priority item and having the feature inconsistent with the trend of April for the non-priority item, images in which a child is shown and which are captured at a park are selected.

Note that the priority item and the non-priority item can be changed depending on the features of the image groups provided by the user. For example, it is assumed that many images of a child who is eating strawberry are included in the material images of April, and no images of a child who is eating strawberry are included and many images of a child who is eating melon are included in the image group of May. In this case, for example, a priority item can be "subject person and action of person", and a non-priority item can be "object shown along with subject person". Specifically, images having a feature consistent with the trend of April for the priority item may be determined to images in which a child who eats fruit is shown. Images having a feature inconsistent with the trend of April for the non-priority item may be determined to images in which fruit shown along with a child is fruit different from strawberry, for example, melon. The material images of May may be selected from the image group of May under such a condition.

The selection processing of May will be supplemented. The images that are selected as the material image of May may include, in addition to images (hereinafter, referred to as main images) that satisfy the above-described condition, images (hereinafter, referred to as sub-images) other than main images. The main images are images having a feature consistent with the trend of April for the priority item and having a feature inconsistent with the trend of April for the non-priority item. The sub-images correspond to, for example, images having no feature consistent with the trend of April for the priority item. It is preferable that a ratio of the sub-images among the material image of May is smaller than a ratio of the main images.

The processor 10A executes the feature specification processing and the trend specification processing in selecting the material images of May. In the feature specification processing, the processor 10A specifies the features of the material images of April and the images included in the image group of May for the above-described three items. In this case, the processor 10A may further specify features of the images included in the image group (first image group) of April for the above-described three items.

In the trend specification processing, the processor 10A specifies the trend (that is, the trend of April) of the features of the material images of April for the above-described three items. In this case, the processor 10A may further specify a trend of the features of the images included in the image group of April. The trend of the features of the images included in the image group of April corresponds to "another trend" in the present invention, and is hereinafter referred to as the trend of the image group of April.

Then, the processor 10A may select the material images of May based on the trend of April and the trend of the image group of April. In this case, the images that are selected as the material images of May may include images having a feature consistent with the trend of the image group of April for the priority item, in addition to the images having the feature consistent with the trend of April for the priority item.

The case of FIG. 11 will be described in connection with a specific example. For the priority item "subject person", the image group of April includes images in which a child is shown, images in which a mother is shown, and images in which a father is shown, at the same ratio. Accordingly, the images in which a child is shown, the images in which a mother is shown, and the images in which a father is shown correspond to images having a feature consistent with the trend of the image group of April for the priority item. In this case, the processor 10A may include the images in which a mother is shown or the images in which a father is shown, in the material images of May along with the images in which a child is shown.

As described above, in a case where the images having the feature consistent with the trend of the image group of April for the priority item are selected as the material images of May, the material images of May (current month) can be selected in consideration of an imaging trend of April (past month). With this, it is possible to ascertain images important for the user from the imaging trend of the past month, and to select material images of the current month based on the images.

Although the flow of the material selection processing of selecting the material image of May has been described above, the same procedure applies to material selection processing of selecting material images of a month after June. For example, material images of June are selected from an image group of June based on the trend of the features of the material image of April and the trend of the features of the material images of May. In this case, the material images of April and the material images of May correspond to first images used in product creation, the image group of June corresponds to a second image group, and the material images of June correspond to second images for product creation.

For example, it is assumed that images in which grandparents are shown are included in the image group of June, and such images are not included in any of the material images of April and the material images of May. In this case, since the images in which grandparents are shown have a feature inconsistent with the trend of the features of the material images of April and the trend of the features of the material images of May, such images may be selected as the material images of June.

Re-Creation Processing

In a case where a re-creation condition is satisfied after the first creation processing of creating the first product of a certain month is executed, the processor 10A executes processing of re-creating the first product with the month as a target month. That is, in the present embodiment, even though the first product F1 is created, in a case where the re-creation condition is satisfied, the first product F1 can be created again as needed. Hereinafter, a flow of the re-creation processing will be described referring to FIG. 14.

The re-creation processing is executed in a case where there is a month for which the re-creation condition is satisfied, that is, the target month, and for example, after the next month of the target month, the processor 10A executes the re-creation processing of re-creating the first product of the target month. Determination about whether or not the re-creation condition is satisfied is performed depending on the presence or absence of an order and the presence or absence of a saving request to the first product.

Figure 14:
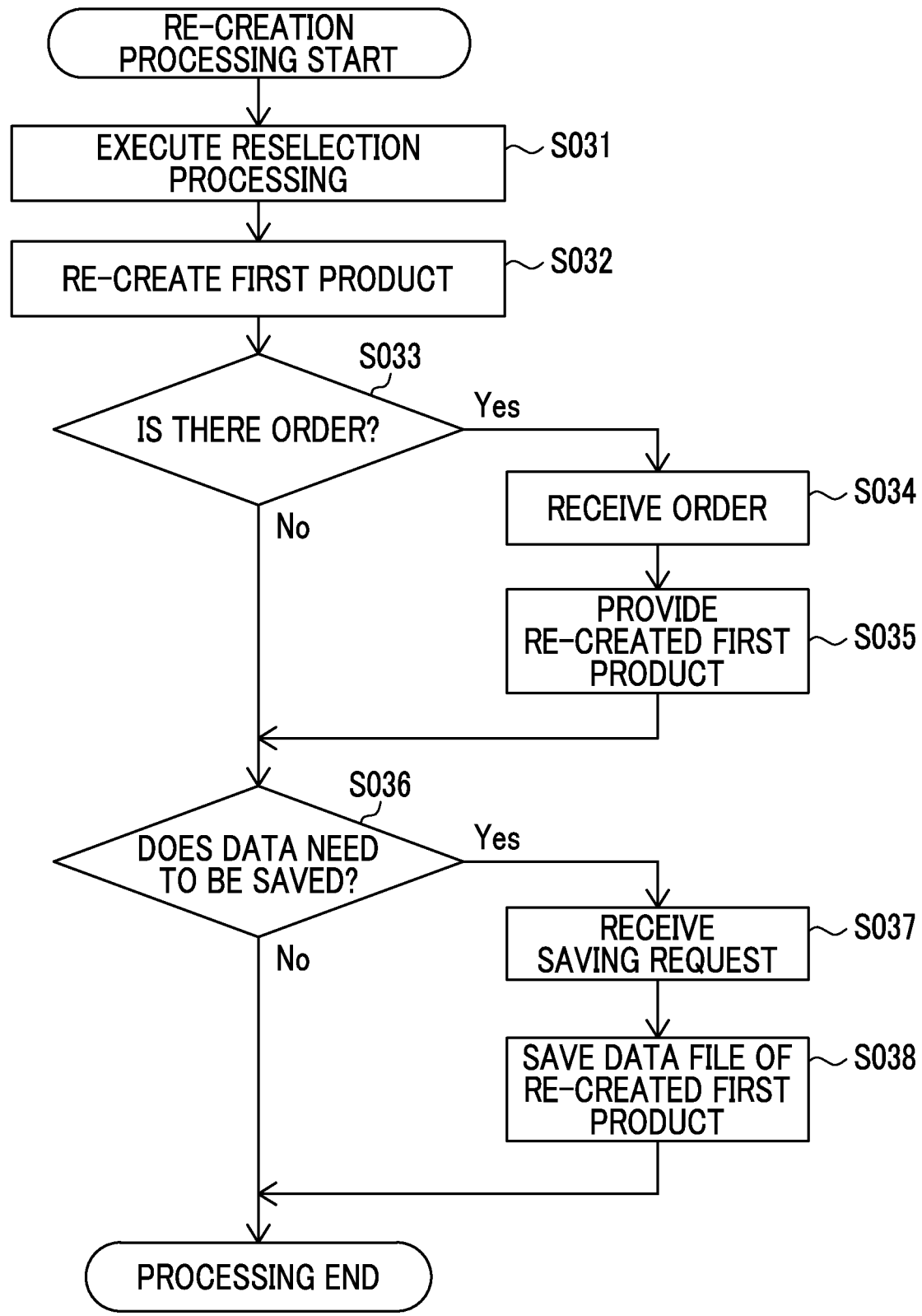
FIG. 14 is a diagram illustrating a flow of re-creation processing.

Specifically, in a case where any of an order or a saving request to the first product of a certain month is not received, the processor 10A sets the month as a target month, and executes the re-creation processing of re-creating the first product of the target month. In the re-creation processing, as shown in FIG. 14, the processor 10A first executes reselection processing of selecting material images of the target month (S031). In the reselection processing, the processor 10A selects the material images for use in the re-creation of the first product of the target month from an image group (an image group of the target month) captured in the target month.

In the reselection processing, the processor 10A specifies features of images included in an image group captured in a reselection period including the target month and specifies a trend of the features of the image group. A procedure of specifying the features of the images and the trend in the reselection processing is the same as in the feature specification processing and the trend specification processing in the material selection processing of the first creation processing. The reselection period is a period starting from a month earlier than the target month and continuing to a month later than the target month. The month earlier than the target month is, for example, a use start month (first month) of the product providing service, and the month later the target month is a month (specifically, a current time) in which the re-creation processing is executed.

The material images for use in re-creating the first product of the target month are selected in consideration of an image group captured in the month later than the target month. That is, in a case of re-creating the first product of the target month, the material images can be selected based on an imaging trend of the user in a period after the target month. With this, it is possible to appropriately ascertain the imaging trend of the user over a longer period, and to re-create the first product of the target month based on the imaging trend.

In detail, as the reselection period is extended, that is, as the last month of one year approaches, the number of image groups acquired by the image processing apparatus 10 every month increases. Then, as the number of image groups increases, it is possible to more accurately specify the imaging trend of the user based on the image group of each month. For example, there is a case where a person who is not shown in the image group of the target month is frequently shown in the image group of the month after the target month. There is also a case where, even though the number of images in which a certain person is shown is small in the image group of the target month, images in which the person is shown are frequently included in the image groups after the target month. Such a person is likely to be an important person for the user, and this turns out after the target month. In a case of referring to the image group captured in the reselection period, the above-described fact can be easily recognized. As a result, it is possible to more accurately select the material images for re-creating the first product of the target month.

After the execution of the reselection processing, the processor 10A selects the material images from the image group of the target month based on a trend of features of the image group captured in the reselection period. Then, the processor 10A re-creates the first product of the target month using the selected material images (S032). A flow after the first product is re-created in the re-creation processing is the same as the flow after the first product is created in the first creation processing. Specifically, the processor 10A generates a data file of the re-created first product of the target month and transmits the data file to the user-side equipment 12. With this, the re-created first product of the target month is displayed on the display of the user-side equipment 12.

The user views the display to confirm the re-created first product of the target month and examines a need of an order (S033). In a case where the user performs an order, the processor 10A receives the order (S034), and executes processing of providing the re-created first product of the target month to the user, specifically, printing processing (S035). With the reception of the order, the processor 10A determines the re-created first product of the target month.

The user examines a need of data saving for the re-created first product of the target month (S036). In a case where the user performs a saving request, the processor 10A receives the saving request (S037), and saves the data file of the re-created first product of the target month in the storage device 14 (S038).

The series of steps according to the above-described re-creation processing is repeatedly executed while the re-creation condition for the target month is satisfied. On the other hand, in a case where the re-creation condition is not satisfied, that is, in a case where the processor 10A receives the order or the saving request to the re-created first product, the re-creation processing for the first product is not executed subsequently.

Second Creation Processing

Figure 15:
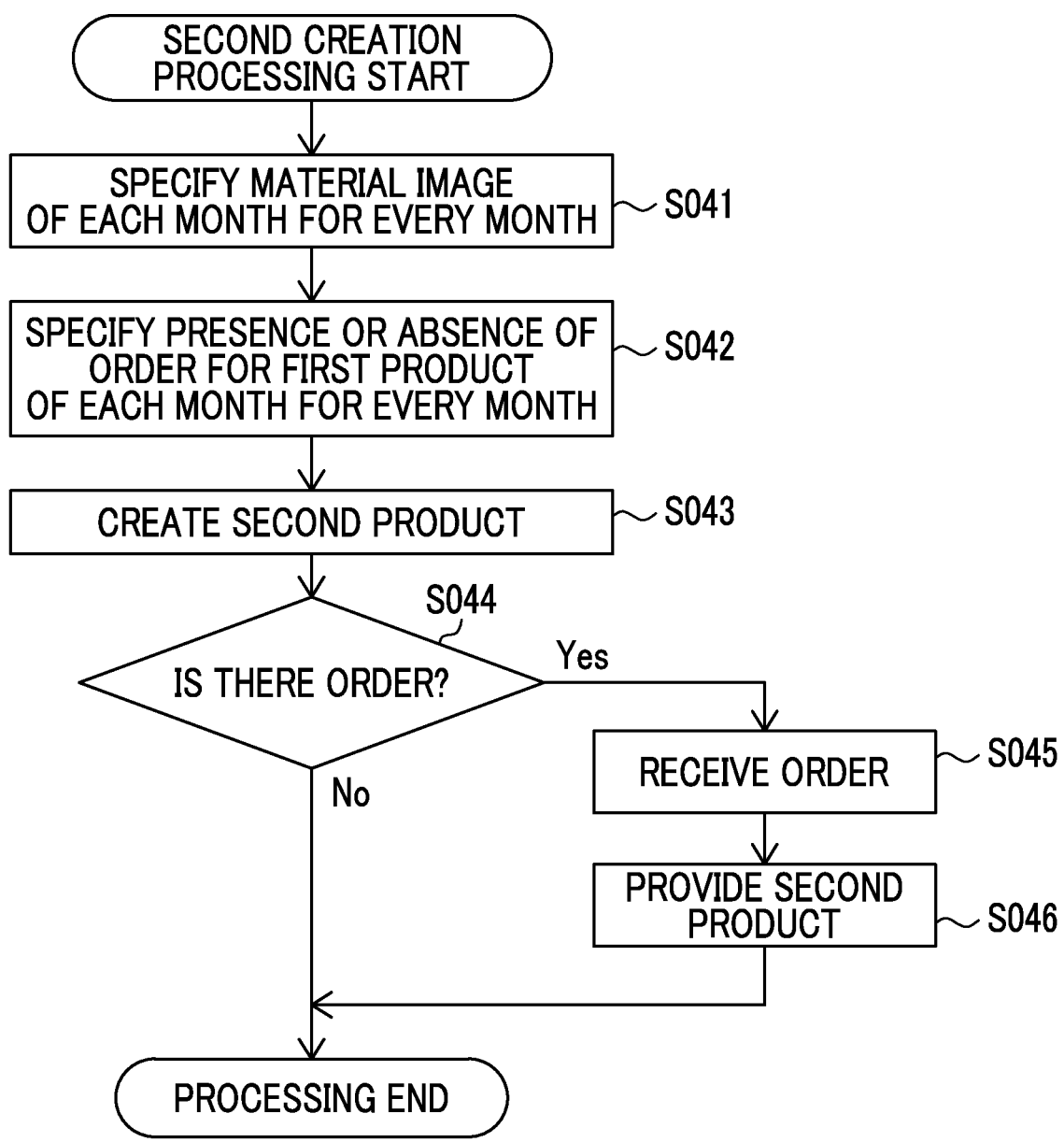
FIG. 15 is a diagram illustrating a flow of second creation processing.

Next, a flow of the second creation processing in the product providing flow will be described referring to FIG. 15. Each step in the second creation processing is executed by the processor 10A of the computer that configures the image processing apparatus 10. In a step before the execution of the second creation processing, the processor 10A creates the first product F1 for each month of 12 months including the last month.

In the second creation processing, first, the processor 10A specifies the material images used in the creation of the first product F1 every month for each of the first products for the 12 months (S041). In Step S041, in specifying the material images of the first product F1 of a month for which the saving request is performed, the processor 10A reads out the data file of the first product F1 from the storage device 14. Then, the processor 10A specifies the material images of the first product from the read-out data file.

In a case where the first product of the target month is re-created, the processor 10A specifies the material images of the re-created first product. In a case where the first product of the target month is re-created multiple times, the processor 10A specifies the material images of the latest first product (that is, the most recently re-created first product).

Next, the processor 10A specifies whether or not an order is received from the user to the first product of each month, every month (S042). Specifically, the processor 10A refers to information indicating an order history of the user to specify the presence or absence of the order to the first product of each month.

Thereafter, the processor 10A creates the second product based on the material image of the first product of each month and the presence or absence of the order to the first product of each month (S043). Specifically, the processor 10A creates each of a plurality of pages included in the second product by the material images of the first product of a month corresponding to each page. For example, in a case where an X-th page of the second product corresponds to May, the processor 10A creates the X-th page using the material images of the first product of May.

The processor 10A sets an image layout in each page depending on the presence or absence of the order to the first product of each month. Specifically, the processor 10A sets the layout of each page such that the material images of the first product of an ordered month (a month in which there is an order to the first product) are disposed with priority. This is because, in the ordered month, there is a high possibility that there is an important event or the like for the user, and it is inferred that the importance of images captured in the ordered month is high.

Figure 16A:
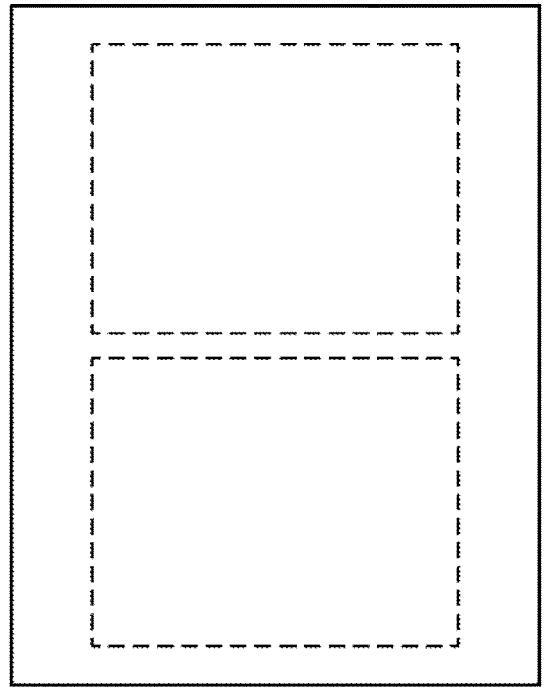
FIG. 16A is a diagram showing an image size in a page corresponding to an ordered month in a second product.

In the second product, a method of handling the material images of the first product of the ordered month with priority is not particularly limited. For example, it is assumed that a size of an image in each page of the second product is set to any of a large size, a medium size, a small size, and a size for index display (minimum size). In this case, in a page corresponding to the ordered month in the second product, as shown in FIG. 16A, the material images of the first product of the ordered month may be disposed in the large size. On the other hand, as shown in FIG. 16B, the material images of the first product of a non-ordered month may be disposed in a size for index display in the last page of the second product.

Figure 16B:
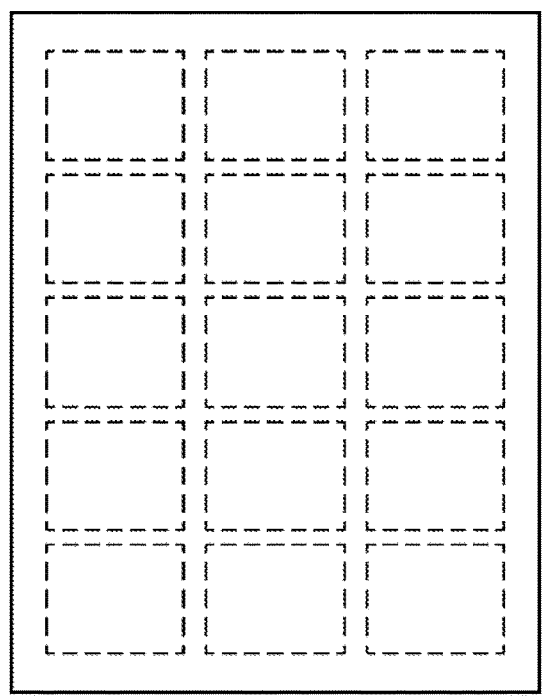
FIG. 16B is a diagram showing an image size in a page corresponding to a non-ordered month in the second product.

In FIGS. 16A and 16B, a size of an image is represented by a broken line in each of a page corresponding to an ordered month and a page corresponding to a non-ordered month.

With the series of steps described above, the second product F2 is completed. Thereafter, in a case where there is an order from the user to the second product, the processor 10A receives the order (S044), and executes processing for providing the second product F2 to the user, for example, printing processing (S045).

When the series of steps described above ends, the second creation processing ends.

Other Embodiments

The above-described embodiment is a specific example for describing the image processing apparatus and the image processing method of the present invention to facilitate understanding and is merely an example, and other embodiments are also considered.

In the above-described embodiment, the first product F1 is created every month. Note that a creation cycle of the first product is not particularly limited, and a first product may be created every day, every week, or every year or a first product may be created in a cycle of several days, several weeks, several months, or several years.

In the above-described embodiment, the second product F2 is created on a yearly basis. Note that a creation cycle of the second product is not particularly limited as long as a plurality of first products are created within the period. For example, a second product may be created every day, every week, or every month or a second product may be created in a cycle of several days, several weeks, several months, or several years.

In the above-described embodiment, in the material selection processing of selecting the material images of the current month, the material images are selected based on the trend of the features of the material images of the past month. Note that the present invention is not limited thereto, and the material images of the current month may be selected based on a trend of features of material images of a month earlier than the past month, for example, a month earlier than the past month by two months or more.

In the above-described embodiment, although the functions of the image processing apparatus of the embodiment of the present invention are exhibited by the processor provided in the server computer, the present invention is not limited thereto. The processor provided in the image processing apparatus of the embodiment of the present invention may be provided in both the server computer and the user-side equipment 12. That is, a part of the functional units provided in the above-described image processing apparatus 10 may be provided in the user-side equipment 12.

In the processor provided in the image processing apparatus of the embodiment of the present invention, various processors are included. An example of various processors is a CPU that is a general-purpose processor configured to execute software (program) to function as various processing units.

Various processors include a programmable logic device (PLD) that is a processor capable of changing a circuit configuration after manufacture, such as a field programmable gate array (FPGA).

Various processors include a dedicated electric circuit that is a processor having a circuit configuration dedicatedly designed for executing specific processing, such as an application specific integrated circuit (ASIC).

One processing unit of the image processing apparatus of the embodiment of the present invention may be configured with one of various processors described above or may be configured with a combination of two or more processors of the same type or different types, for example, a combination of a plurality of FPGAs or a combination of an FPGA and a CPU.

A plurality of functional units of the image processing apparatus of the embodiment of the present invention may be configured with one of various processors or two or more of a plurality of functional units may be put together and configured with one processor.

As in the above-described embodiment, a form may be made in which one processor is configured with a combination of one or more CPUs and software, and the processor functions as a plurality of functional units.

For example, as represented by System on Chip (SoC) or the like, a form may be made in which a processor that realizes all functions of a system including a plurality of functional units in the image processing apparatus with one integrated circuit (IC) chip is used. The hardware configuration of various processors described above may be an electric circuit (Circuitry) in which circuit elements, such as semiconductor elements, are combined.

EXPLANATION OF REFERENCES

10: image processing apparatus
10A: processor
10B: memory
10C: communication interface
10D: printer
12: user-side equipment
14: storage device
21: image acquisition unit
22: preliminary selection unit
23: material selection unit
24: edition unit
25: first production creation unit
26: recommendation unit
27: order reception unit
28: request reception unit
29: reselection unit
30: re-creation unit
31: second product creation unit
F1: first product
F2: second product
N: network
S: product providing system

What is claimed is:

1. An image processing apparatus used to create a product including images selected from an image group provided by a user, the image processing apparatus comprising:
a processor,
wherein the processor is configured to execute
first acquisition processing of acquiring a first image group captured in a first period,
second acquisition processing of acquiring a second image group captured in a second period different from the first period,
feature specification processing of specifying features on two or more items of first images which have been used in product creation in the first image group and second images included in the second image group for product creation,
trend specification processing of specifying a trend of features of the first images used in product creation for the two or more items, and
selection processing of selecting second images for product creation from the second image group based on features of the second images included in the second image group,
the processor is configured to select the second images having a feature inconsistent with the trend for a part of items among the two or more items, as the second images for product creation in the selection processing,
the processor is configured to obtain a first trend value obtained by digitalizing the trend in the trend specification processing, and
the processor is configured to select the second images for product creation such that a difference between a second trend value obtained by digitalizing a trend of features of the second images for product creation and the first trend value is equal to or greater than a set value in the selection processing.

2. The image processing apparatus according to claim 1, wherein the two or more items include a priority item that is set depending on the trend, and a non-priority item other than the priority item, and the processor is configured to select the second images having a feature consistent with the trend for the priority item and a feature inconsistent with the trend for the non-priority item, as the second images for product creation in the selection processing.

3. The image processing apparatus according to claim 2, wherein, in the trend specification processing, the processor is configured to classify the first images used in product creation into a plurality of classifications based on the features of the first images used in product creation for each of the two or more items and calculate a first ratio of first images belonging to each classification for every classification to specify the trend, and classify the second images included in the second image group into the plurality of classifications based on the features of the second images included in the second image group for each of the two or more items and calculate a second ratio of second images belonging to each classification for every classification.

4. The image processing apparatus according to claim 3, wherein the processor is configured to select second images belonging to the classification where the second ratio increases more than the first ratio for the non-priority item, as the second images for product creation in the selection processing.

5. The image processing apparatus according to claim 1, wherein the processor is configured to further specify features on the two or more items for first images included in the first image group in the feature specification processing, the processor is configured to specify the trend of the features of the first images used in product creation and another trend as a trend of the features of the first images included in the first image group for the two or more items in the trend specification processing, and the processor is configured to select the second images for product creation based on the trend and the other trend in the selection processing.

6. The image processing apparatus according to claim 1, wherein the processor is configured to use an image group captured in one period among a plurality of periods and execute first creation processing of creating a first product for the one period, for every period.

7. The image processing apparatus according to claim 6, wherein the first creation processing includes layout determination processing of determining a layout of images in the first product based on a layout edition operation of a user, and the processor is configured to suggest the layout of the images in the first product for the first period to the user and create the first product for the second period in the suggested layout in a case where the user employs the suggested layout, in the first creation processing of creating the first product for the second period.

8. The image processing apparatus according to claim 6, wherein the first creation processing includes material selection processing of selecting material images for use in creating the first product for the one period from the image group captured in the one period, the processor is configured to execute re-creation processing of re-creating the first product for the one period in a case where a re-creation condition is satisfied after executing the first creation processing of creating the first product for the one period, and the re-creation processing includes reselection processing of selecting the material images for use in re-creating the first product from the image group captured in the one period.

9. The image processing apparatus according to claim 8, wherein the re-creation processing is executed in a period later than the one period, and the processor is configured to select the material images from the image group captured in the one period based on a trend of features of image groups captured in two or more periods including the one period and a period later than the one period among the plurality of periods in the reselection processing.

10. The image processing apparatus according to claim 8, wherein the processor is configured to receive a saving request of a user to the first product, and the processor is configured to, after the execution of the first creation processing of creating the first product for the one period, not execute the re-creation processing of re-creating the first product for the one period in a case where the saving request to the first product for the one period is received, and execute the re-creation processing of re-creating the first product for the one period in a case where the saving request to the first product for the one period is not received.

11. The image processing apparatus according to claim 8, wherein the processor is configured to receive an order of a user to the first product, and the processor is configured to, after the execution of the first creation processing of creating the first product for the one period, not execute the re-creation processing of re-creating the first product for the one period in a case where the order to the first product for the one period is received, and execute the re-creation processing of re-creating the first product for the one period in a case where the order to the first product for the one period is not received.

12. The image processing apparatus according to claim 8, wherein the processor is configured to use the material images used in each of the first products created for every period and further execute second creation processing of creating a second product for the plurality of periods, the second product is composed by collecting a plurality of second product composition pieces, and the processor is configured to create each of the plurality of second product composition pieces using the material images used in the creation of the first product for a period corresponding to each second product composition piece among the plurality of periods in the second creation processing.

13. The image processing apparatus according to claim 12, wherein the processor is configured to receive an order of a user to the first product, and the processor is configured to set a layout of the material images in each of the plurality of second product composition pieces depending on presence or absence of an order to the first product for a period corresponding to each second product composition piece in the second creation processing.

14. An image processing method by a processor, the image processing method used to create a product including images selected from an image group provided by a user, wherein, with the processor, first acquisition processing of acquiring a first image group captured in a first period, second acquisition processing of acquiring a second image group captured in a second period different from the first period, feature specification processing of specifying features on two or more items of first images which have been used in product creation in the first image group and second images included in the second image group for product creation, trend specification processing of specifying a trend of features of the first images used in product creation for the two or more items, and selection processing of selecting second images for product creation from the second image group based on features of the second images included in the second image group are executed, in the selection processing, the second images having a feature inconsistent with the trend for a part of items among the two or more items are selected as the second images for product creation, in the trend specification processing, with the processor, a first trend value obtained by digitalizing the trend is obtained, and in the selection processing, with the processor, the second images for product creation are selected such that a difference between a second trend value obtained by digitalizing a trend of features of the second images for product creation and the first trend value is equal to or greater than a set value.

15. The image processing method according to claim 14, wherein the two or more items include a priority item that is set depending on the trend, and a non-priority item other than the priority item, and in the selection processing, with the processor, the second images having a feature consistent with the trend for the priority item and a feature inconsistent with the trend for the non-priority item are selected as the second images for product creation.

16. The image processing method according to claim 15, wherein, in the trend specification processing, with the processor, the first images used in product creation are classified into a plurality of classifications based on the features of the first images used in product creation for each of the two or more items and a first ratio of first images belonging to each classification is calculated for every classification to specify the trend, and the second images included in the second image group are classified into the plurality of classifications based on the features of the second images included in the second image group for each of the two or more items and a second ratio of second images belonging to each classification is calculated for every classification.

17. The image processing method according to claim 16, wherein, in the selection processing, with the processor, second images belonging to the classification where the second ratio increases more than the first ratio for the non-priority item are selected as the second images for product creation.

18. The image processing method according to claim 14, wherein, in the feature specification processing, with the processor, features on the two or more items are further specified for first images included in the first image group, in the trend specification processing, with the processor, the trend of the features of the first images used in product creation and another trend as a trend of the features of the first images included in the first image group are specified for the two or more items, and in the selection processing, with the processor, the second images for product creation are selected based on the trend and the other trend.

19. A non-transitory computer readable recording medium storing a program that causes a computer to execute respective processing included in the image processing method according to claim 14.

\* \* \* \* \*